(12) United States Patent
Nagamura

(10) Patent No.: US 10,917,808 B2
(45) Date of Patent: *Feb. 9, 2021

(54) EXTRA-VEHICULAR COMMUNICATION DEVICE, ONBOARD DEVICE, ONBOARD COMMUNICATION SYSTEM, COMMUNICATION CONTROL METHOD, AND COMMUNICATION CONTROL PROGRAM

(71) Applicant: Sumitomo Electric Industries, Ltd., Osaka (JP)

(72) Inventor: Yoshihisa Nagamura, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/906,590

(22) Filed: Jun. 19, 2020

(65) Prior Publication Data

US 2020/0322830 A1 Oct. 8, 2020

Related U.S. Application Data

(63) Continuation of application No. 16/485,819, filed as application No. PCT/JP2018/005146 on Feb. 15, 2018, now Pat. No. 10,735,988.

(30) Foreign Application Priority Data

Feb. 16, 2017 (JP) .................. 2017-026932

(51) Int. Cl.
*H04W 28/02* (2009.01)
*H04W 4/48* (2018.01)
(Continued)

(52) U.S. Cl.
CPC ........ *H04W 28/0226* (2013.01); *G08G 1/093* (2013.01); *H04W 4/029* (2018.02); *H04W 4/48* (2018.02)

(58) Field of Classification Search
CPC ... H04W 28/0226; H04W 4/029; H04W 4/48; G08G 1/093
(Continued)

(56) References Cited

FOREIGN PATENT DOCUMENTS

JP 2012-164327 A 8/2012
JP 2013-168865 A 8/2013

*Primary Examiner* — Joel Ajayi
(74) *Attorney, Agent, or Firm* — Baker Botts L.L.P.; Michael A. Sartori

(57) ABSTRACT

Provided is an extra-vehicular communication device, installed on a vehicle, including: a reception unit configured to receive data from an external device located outside the vehicle; a position acquisition unit configured to create, based on the data received by the reception unit, transmission source position information indicating a position of a transmission source of the data; a correspondence information acquisition unit configured to acquire correspondence information that indicates a correspondence relationship between peripheral position information indicating a position of a peripheral area around the vehicle, and a priority level; a setting unit configured to set a priority level for the data, on the basis of the transmission source position information created by the position acquisition unit and the correspondence information acquired by the correspondence information acquisition unit; and a processing unit configured to process the data in accordance with the priority level set by the setting unit.

8 Claims, 14 Drawing Sheets

(51) Int. Cl.
*H04W 4/029* (2018.01)
*G08G 1/09* (2006.01)
(58) Field of Classification Search
USPC ....................................................... 455/456.3
See application file for complete search history.

FIG. 3

| VEHICLE POSITION || RADIUS (m) | PRIORITY LEVEL |
|---|---|---|---|
| X | Y | | |
| X0 | Y0 | 0~r1 | 0 |
| X0 | Y0 | r1~r2 | 7 |
| ⋮ | ⋮ | ⋮ | ⋮ |

Tab1

FIG. 6

| VEHICLE POSITION | | AZIMUTH (°) | DISTANCE (m) | PRIORITY LEVEL |
|---|---|---|---|---|
| X | Y | | | |
| X0 | Y0 | −20~+20 | 16~24 | 7 |
| X0 | Y0 | +30~+60 | 6~14 | 7 |
| X0 | Y0 | −60~−30 | 6~14 | 7 |
| X0 | Y0 | α1~α2 | r3~r4 | 6 |
| ⋮ | ⋮ | ⋮ | ⋮ | ⋮ |

Tab2

FIG. 8

| FORWARD DIRECTION(°) | MESH REFERENCE POSITION | | MESH LENGTH | MESH WIDTH | PRIORITY LEVEL |
|---|---|---|---|---|---|
| | X | Y | | | |
| β | X1 | Y1 | L1 | W1 | 6 |
| β | X2 | Y2 | L2 | W2 | 6 |
| ... | ... | ... | ... | ... | ... |

Tab3

EXTRA-VEHICULAR COMMUNICATION DEVICE, ONBOARD DEVICE, ONBOARD COMMUNICATION SYSTEM, COMMUNICATION CONTROL METHOD, AND COMMUNICATION CONTROL PROGRAM

TECHNICAL FIELD

The present invention relates to an extra-vehicular communication device, an on-vehicle device, an on-vehicle communication system, a communication control method, and a communication control program.

This application claims priority on Japanese Patent Application No. 2017-26932 filed on Feb. 16, 2017, the entire contents of which are incorporated herein by reference.

BACKGROUND ART

Patent Literature 1 (Japanese Laid-Open Patent Publication No. 2013-168865) discloses an on-vehicle network system as follows. That is, the on-vehicle network system includes: an on-vehicle control unit having a memory that stores therein definition data defining a part, of protocol used in an on-vehicle network, which depends on implementation on the on-vehicle network; and a protocol issuing device that issues the definition data to the on-vehicle control unit. When the protocol issuing device receives, from a registration device that allows the on-vehicle control unit to participate in the on-vehicle network, a registration request that requests participation of the on-vehicle control unit in the on-vehicle network, the protocol issuing device performs authentication for the registration device, creates the definition data based on implementation on the on-vehicle network, and returns the definition data to the registration device. The registration device receives the definition data transmitted from the protocol issuing device, and requests the on-vehicle control unit to store the received definition data in the memory. Then, the on-vehicle control unit receives the definition data from the registration device, stores the definition data in the memory, and performs communication by using the on-vehicle network, based on the part, of the protocol, defined by the definition data.

CITATION LIST

Patent Literature

PATENT LITERATURE 1: Japanese Laid-Open Patent Publication No. 2013-168865

SUMMARY OF INVENTION (1) An extra-vehicular communication device according to the present disclosure is an extra-vehicular communication device installed on a vehicle, and includes: a reception unit configured to receive data from an external device located outside the vehicle; a position acquisition unit configured to create, based on the data received by the reception unit, transmission source position information indicating a position of a transmission source of the data; a correspondence information acquisition unit configured to acquire correspondence information that indicates a correspondence relationship between peripheral position information indicating a position of a peripheral area around the vehicle, and a priority level; a setting unit configured to set a priority level for the data, on the basis of the transmission source position information created by the position acquisition unit and the correspondence information acquired by the correspondence information acquisition unit; and a processing unit configured to process the data in accordance with the priority level set by the setting unit.

(4) An on-vehicle device according to the present disclosure is an on-vehicle device installed on a vehicle, and includes: a processing unit configured to create correspondence information that indicates a correspondence relationship between peripheral position information indicating a position of a peripheral area around the vehicle, and a priority level, for transmission in an on-vehicle network, of the data transmitted by a device located in the peripheral area; and a communication unit configured to transmit the correspondence information created by the processing unit to an extra-vehicular communication device that is installed on the vehicle and is communicable with an external device located outside the vehicle.

(11) An on-vehicle communication system according to the present disclosure includes: an extra-vehicular communication device installed on a vehicle; and an on-vehicle device configured to create correspondence information that indicates a correspondence relationship between peripheral position information indicating a position of a peripheral area around the vehicle, and a priority level, and transmits the created correspondence information to the extra-vehicular communication device. The extra-vehicular communication device receives data from an external device located outside the vehicle, and creates, based on the received data, transmission source position information indicating a position of a transmission source of the data. The extra-vehicular communication device receives the correspondence information from the on-vehicle device, sets a priority level for the data on the basis of the received correspondence information and the created transmission source position information, and processes the data in accordance with the set priority level.

(12) A communication control method according to the present disclosure is a communication control method performed in an extra-vehicular communication device installed on a vehicle, and the method includes the steps of: receiving data from an external device located outside the vehicle; based on the received data, creating transmission source position information indicating a position of a transmission source of the data; acquiring correspondence information that indicates a correspondence relationship between peripheral position information indicating a position of a peripheral area around the vehicle, and a priority level; setting a priority level for the data, on the basis of the created transmission source position information and the acquired correspondence information; and processing the data in accordance with the set priority level.

(13) A communication control method according to the present disclosure is a communication control method performed in an on-vehicle device installed on a vehicle, and includes: creating correspondence information indicating a correspondence relationship between peripheral position information indicating a position of a peripheral area around the vehicle, and a priority level, for transmission in an on-vehicle network, of data transmitted by a device located in the peripheral area; and transmitting the created correspondence information to an extra-vehicular communication device that is installed on the vehicle and is communicable with an external device located outside the vehicle.

(14) A communication control method according to the present disclosure is a communication control method performed in an on-vehicle communication system including an extra-vehicular communication device installed on a vehicle, and an on-vehicle device. The method includes the steps of: creating, by the on-vehicle device, correspondence information that indicates a correspondence relationship between peripheral position information indicating a position of a peripheral area around the vehicle, and a priority level; transmitting, by the on-vehicle device, the created correspondence information to the extra-vehicular communication device; receiving, by the extra-vehicular communication device, data from an external device located outside the vehicle; creating, by the extra-vehicular communication device, transmission source position information indicating a position of a transmission source of the received data on the basis of the data; receiving, by the extra-vehicular communication device, the correspondence information from the on-vehicle device; setting, by the extra-vehicular communication device, a priority level for the data on the basis of the received correspondence information and the created transmission source position information; and processing, by the extra-vehicular communication device, the data in accordance with the set priority level.

(15) A communication control program according to the present disclosure is a communication control program used in an extra-vehicular communication device installed on a vehicle, and the program causes a computer to function as: a reception unit configured to receive data from an external device located outside the vehicle; a position acquisition unit configured to create, based on the data received by the reception unit, transmission source position information indicating a position of a transmission source of the data; a correspondence information acquisition unit configured to acquire correspondence information that indicates a correspondence relationship between peripheral position information indicating a position of a peripheral area around the vehicle, and a priority level; a setting unit configured to set a priority level for the data, on the basis of the transmission source position information created by the position acquisition unit and the correspondence information acquired by the correspondence information acquisition unit; and a processing unit configured to process the data in accordance with the priority level set by the setting unit.

(16) A communication control program according to the present disclosure is a communication control program used in an on-vehicle device installed on a vehicle, and the program causes a computer to function as: a processing unit configured to create correspondence information that indicates a correspondence relationship between peripheral position information indicating a position of a peripheral area around the vehicle, and a priority level; and a communication unit configured to transmit the correspondence information created by the processing unit to an extra-vehicular communication device that is installed on the vehicle and is communicable with an external device located outside the vehicle.

One mode of the present disclosure can be realized not only as an extra-vehicular communication device including such a characteristic processing unit but also as a semiconductor integrated circuit that realizes a part or the entire of the extra-vehicular communication device.

One mode of the present disclosure can be realized not only as an on-vehicle device including such a characteristic processing unit but also as a semiconductor integrated circuit that realizes a part or the entire of the on-vehicle device.

One mode of the present disclosure can be realized not only as an on-vehicle communication system including such a characteristic processing unit but also as a semiconductor integrated circuit that realizes a part or the entire of the on-vehicle communication system.

BRIEF DESCRIPTION OF DRAWINGS

FIG. 3 shows an example of a peripheral area table created by a priority determination device in the on-vehicle communication system according to the first embodiment of the present disclosure.

FIG. 6 shows an example of a peripheral area table created by the priority determination device in the on-vehicle communication system according to the first embodiment of the present disclosure.

FIG. 8 shows an example of a peripheral area table created by the priority determination device in the on-vehicle communication system according to the first embodiment of the present disclosure.

DESCRIPTION OF EMBODIMENTS

Figure 1:
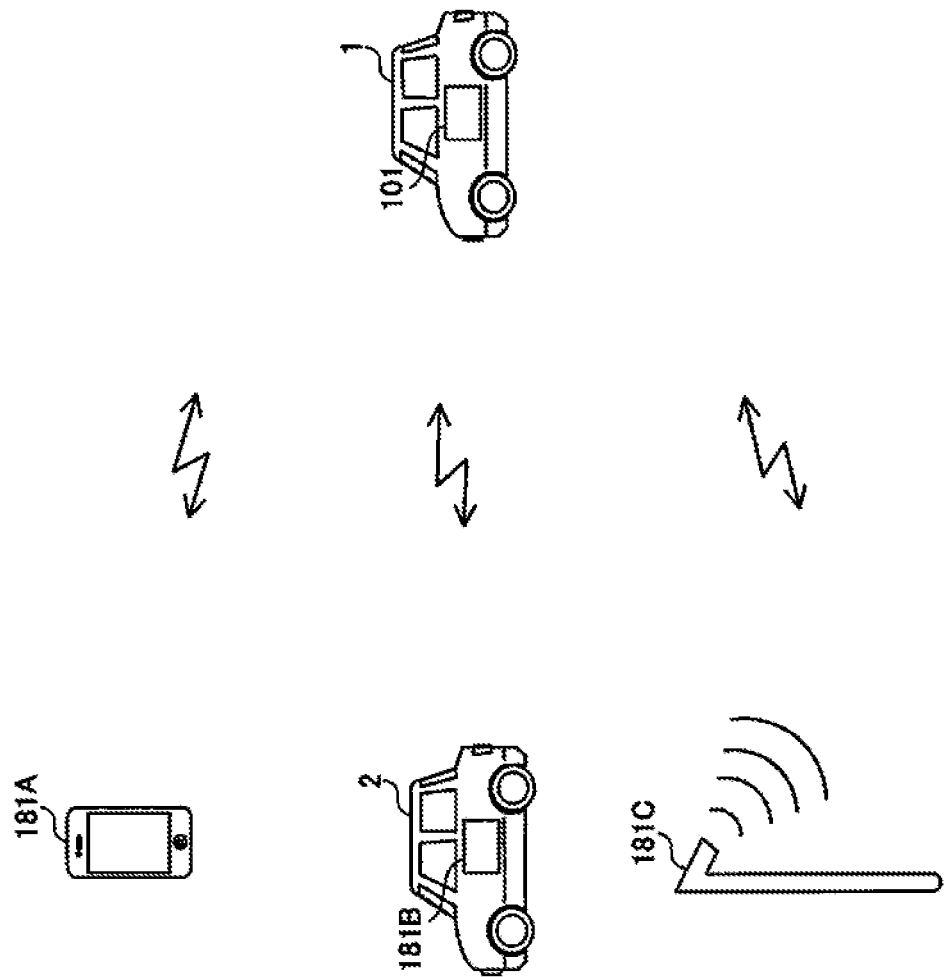
FIG. 1 shows a configuration of a communication system according to a first embodiment of the present disclosure.

To date, an on-vehicle network system for improving security on an on-vehicle network has been developed.

Problem to be Solved by the Present Disclosure

For example, in a case where the on-vehicle network described in Patent Literature 1 is connected to an external network outside a vehicle, an extra-vehicular communication device for communication with the external network may be provided in the vehicle. When the extra-vehicular communication device communicates with wireless terminal devices outside the vehicle, if the number of the wireless terminal devices increases or the amount of communication data between the extra-vehicular communication device and the wireless terminal devices increases, the amount of data transmitted in the on-vehicle network significantly increases. In this case, useful information may not be satisfactorily transmitted in the on-vehicle network.

The present disclosure has been made to solve the aforementioned problem, and an object of the present disclosure is to provide an extra-vehicular communication device, an on-vehicle device, an on-vehicle communication system, a communication control method, and a communication control program which are able to satisfactorily transmit useful information in an on-vehicle network.

Effect of the Present Disclosure

According to the present disclosure, useful information can be satisfactorily transmitted in an on-vehicle network.

DESCRIPTION OF EMBODIMENT OF THE PRESENT DISCLOSURE

First, the content of an embodiment of the present disclosure is listed and described.

(1) An extra-vehicular communication device according to an embodiment of the present disclosure is an extra-vehicular communication device installed on a vehicle, and includes: a reception unit configured to receive data from an external device located outside the vehicle; a position acquisition unit configured to create, based on the data received by the reception unit, transmission source position information indicating a position of a transmission source of the data; a correspondence information acquisition unit configured to acquire correspondence information that indicates a correspondence relationship between peripheral position information indicating a position of a peripheral area around the vehicle, and a priority level; a setting unit configured to set a priority level for the data, on the basis of the transmission source position information created by the position acquisition unit and the correspondence information acquired by the correspondence information acquisition unit; and a processing unit configured to process the data in accordance with the priority level set by the setting unit.

As described above, a priority level according to the position of an external device is set for data from the external device. Therefore, when, for example, autonomous driving control is performed, a high priority level can be set for data from an external device located in a significant peripheral area where presence/absence of an object should be confirmed. Further, since the data is processed according to the set priority level, it is possible to perform a process of preferentially transmitting the data with the high priority level in the on-vehicle network. Thus, the data from the external device located in the significant peripheral area can be more reliably transmitted to, for example, an on-vehicle device that performs autonomous driving control. Therefore, in the on-vehicle network, useful information can be satisfactorily transmitted.

(2) Preferably, the correspondence information is updated, and the correspondence information acquisition unit acquires, as post-update correspondence information, a combination of peripheral position information and a priority level, which is different from the correspondence information acquired previously.

As described above, since a combination of peripheral position information and a priority level, which is different from the correspondence information acquired previously, is acquired, a different part of the correspondence information from the correspondence information acquired previously can be rewritten, whereby the process of updating the correspondence information can be efficiently performed. In addition, since the amount of data of the post-update correspondence information can be reduced, for example, communication load in the on-vehicle network can be reduced.

(3) Preferably, the correspondence information acquisition unit acquires new correspondence information in accordance with movement of the vehicle.

According to the above configuration, for example, even when the significant peripheral area is shifted because the traffic environment around the vehicle changes with movement of the vehicle, it is possible to set an appropriate priority level according to the traffic environment for the data from the external device, on the basis of the correspondence information in which the current traffic environment is reflected.

(4) An on-vehicle device according to the embodiment of present disclosure is an on-vehicle device installed on a vehicle, and includes: a processing unit configured to create correspondence information that indicates a correspondence relationship between peripheral position information indicating a position of a peripheral area around the vehicle, and a priority level, for transmission in an on-vehicle network, of the data transmitted by a device located in the peripheral area; and a communication unit configured to transmit the correspondence information created by the processing unit to an extra-vehicular communication device that is installed on the vehicle and is communicable with an external device located outside the vehicle.

According to the above configuration, in the extra-vehicular communication device, a priority level according to the position of an external device can be set for data from the external device. For example, when autonomous driving control is performed, a high priority level can be set for data from an external device located in a significant peripheral area where presence/absence of an object should be confirmed. Further, in the extra-vehicular communication device, the data can be processed according to the set priority level. For example, it is possible to perform a process of preferentially transmitting the data with the high priority level in the on-vehicle network. Thus, the data from the external device located in the significant peripheral area can be more reliably transmitted to, for example, an on-vehicle device that performs autonomous driving control. Consequently, useful information can be satisfactorily transmitted in the on-vehicle network.

(5) Preferably, the processing unit creates correspondence information that indicates a correspondence relationship between peripheral position information indicating a relative position of the peripheral area with respect to the vehicle, and a priority level.

According to this configuration, when autonomous driving control is performed, a high priority level can be set for data from an external device that is located in a peripheral area where it is difficult for a sensor or the like installed on the vehicle to detect an object.

(6) Preferably, the processing unit creates correspondence information that indicates a correspondence relationship between peripheral position information indicating an absolute position of the peripheral area, and a priority level.

According to the above configuration, when autonomous driving control or the like is performed, for example, the process unit can grasp the vehicle on a map, whereby it is possible to set a high priority level for data from an external device located in a peripheral area, such as an intersection a few hundred meters ahead, which is difficult to be detected by the sensor or the like installed on the vehicle. Further, for example, an appropriate priority level can be set by using information relating to a traffic event, such as information about a point where traffic accidents often occur due to jumping-out onto the road, or information about a roadwork to be held.

(7) Preferably, the processing unit and the extra-vehicular communication device retain common area division information indicating a periphery of the vehicle being divided into a plurality of peripheral areas, and the processing unit creates correspondence information that indicates a correspondence relationship between identification information of each peripheral area in the area division information, and a priority level.

According to the above configuration, since the amount of data transmitted from the on-vehicle device can be reduced, for example, communication load in the on-vehicle network can be reduced.

(8) More preferably, the processing unit and the extra-vehicular communication device retain a plurality of types of area division information, and the processing unit transmits the identification information in the area division information to the extra-vehicular communication device via the communication unit, thereby changing the area division information.

According to the above configuration, it is possible to adopt appropriate division of peripheral areas and appropriate setting of priority levels according to the surrounding environment or the like of a vehicle.

(9) Preferably, the processing unit sets the priority level in accordance with at least one of a traveling direction, a traveling speed, a traveling road, a traveling position, a traveling mode, and a scheduled traveling route of the vehicle.

According to the above configuration, it is possible to set an appropriate priority level according to the traveling state or the like of the vehicle.

(10) Preferably, the processing unit sets the priority level in accordance with at least one of: a result of detection of an object around the vehicle; event information, acquired from outside the vehicle, which relates to a traffic event around the vehicle; and the event information retained in the processing unit.

According to the above configuration, it is possible to set an appropriate priority level according to the surrounding environment or the like of the vehicle.

(11) An on-vehicle communication system according to the embodiment of present disclosure includes: an extra-vehicular communication device installed on a vehicle; and an on-vehicle device configured to create correspondence information that indicates a correspondence relationship between peripheral position information indicating a position of a peripheral area around the vehicle, and a priority level, and transmits the created correspondence information to the extra-vehicular communication device. The extra-vehicular communication device receives data from an external device located outside the vehicle, and creates, based on the received data, transmission source position information indicating a position of a transmission source of the data. The extra-vehicular communication device receives the correspondence information from the on-vehicle device, sets a priority level for the data on the basis of the received correspondence information and the created transmission source position information, and processes the data in accordance with the set priority level.

As described above, a priority level according to the position of an external device is set for data from the external device. Therefore, when, for example, autonomous driving control is performed, a high priority level can be set for data from an external device located in a significant peripheral area where presence/absence of an object should be confirmed. Further, since the data is processed according to the set priority level, it is possible to perform a process of preferentially transmitting the data with the high priority level in the on-vehicle network. Thus, the data from the external device located in the significant peripheral area can be more reliably transmitted to, for example, an on-vehicle device that performs autonomous driving control. Therefore, in the on-vehicle network, useful information can be satisfactorily transmitted.

(12) A communication control method according to the embodiment of the present disclosure is a communication control method performed in an extra-vehicular communication device installed on a vehicle, and the method includes the steps of: receiving data from an external device located outside the vehicle; based on the received data, creating transmission source position information indicating a position of a transmission source of the data; acquiring correspondence information that indicates a correspondence relationship between peripheral position information indicating a position of a peripheral area around the vehicle, and a priority level; setting a priority level for the data, on the basis of the created transmission source position information and the acquired correspondence information; and processing the data in accordance with the set priority level.

As described above, a priority level according to the position of an external device is set for data from the external device. Therefore, when, for example, autonomous driving control is performed, a high priority level can be set for data from an external device located in a significant peripheral area where presence/absence of an object should be confirmed. Further, since the data is processed according to the set priority level, it is possible to perform a process of preferentially transmitting the data with the high priority level in the on-vehicle network. Thus, the data from the external device located in the significant peripheral area can be more reliably transmitted to, for example, an on-vehicle device that performs autonomous driving control. Therefore, in the on-vehicle network, useful information can be satisfactorily transmitted.

(13) A communication control method according to the embodiment of the present disclosure is a communication control method performed in an on-vehicle device installed on a vehicle, and includes: creating correspondence information indicating a correspondence relationship between peripheral position information indicating a position of a peripheral area around the vehicle, and a priority level, for transmission in an on-vehicle network, of data transmitted by a device located in the peripheral area; and transmitting the created correspondence information to an extra-vehicular communication device that is installed on the vehicle and is communicable with an external device located outside the vehicle.

According to the above method, in the extra-vehicular communication device, a priority level according to the position of an external device can be set for data from the external device. Therefore, when, for example, autonomous driving control is performed, a high priority level can be set for data from an external device located in a significant peripheral area where presence/absence of an object should be confirmed. Further, in the extra-vehicular communication device, the data can be processed according to the set priority level. For example, it is possible to perform a process of preferentially transmitting the data with the high priority level in the on-vehicle network. Thus, the data from the external device located in the significant peripheral area can be more reliably transmitted to, for example, an on-vehicle device that performs autonomous driving control. Therefore, in the on-vehicle network, useful information can be satisfactorily transmitted.

(14) A communication control method according to the embodiment of the present disclosure is a communication control method performed in an on-vehicle communication system including an extra-vehicular communication device installed on a vehicle, and an on-vehicle device. The method includes the steps of: creating, by the on-vehicle device, correspondence information that indicates a correspondence relationship between peripheral position information indicating a position of a peripheral area around the vehicle, and a priority level; transmitting, by the on-vehicle device, the created correspondence information to the extra-vehicular communication device; receiving, by the extra-vehicular communication device, data from an external device located outside the vehicle; creating, by the extra-vehicular communication device, transmission source position information indicating a position of a transmission source of the received data on the basis of the data; receiving, by the extra-vehicular communication device, the correspondence information from the on-vehicle device; setting, by the extra-vehicular communication device, a priority level for the data on the basis of the received correspondence information and the created transmission source position information; and processing, by the extra-vehicular communication device, the data in accordance with the set priority level.

As described above, a priority level according to the position of an external device is set for data from the external device. Therefore, when, for example, autonomous driving control is performed, a high priority level can be set for data from an external device located in a significant peripheral area where presence/absence of an object should be confirmed. Further, since the data is processed according to the set priority level, it is possible to perform a process of preferentially transmitting the data with the high priority level in the on-vehicle network. Thus, the data from the external device located in the significant peripheral area can be more reliably transmitted to, for example, an on-vehicle device that performs autonomous driving control. Therefore, in the on-vehicle network, useful information can be satisfactorily transmitted.

(15) A communication control program according to the embodiment of the present disclosure is a communication control program used in an extra-vehicular communication device installed on a vehicle, and the program causes a computer to function as: a reception unit configured to receive data from an external device located outside the vehicle; a position acquisition unit configured to create, based on the data received by the reception unit, transmission source position information indicating a position of a transmission source of the data; a correspondence information acquisition unit configured to acquire correspondence information that indicates a correspondence relationship between peripheral position information indicating a position of a peripheral area around the vehicle, and a priority level; a setting unit configured to set a priority level for the data, on the basis of the transmission source position information created by the position acquisition unit and the correspondence information acquired by the correspondence information acquisition unit; and a processing unit configured to process the data in accordance with the priority level set by the setting unit.

As described above, a priority level according to the position of an external device is set for data from the external device. Therefore, when, for example, autonomous driving control is performed, a high priority level can be set for data from an external device located in a significant peripheral area where presence/absence of an object should be confirmed. Further, since the data is processed according to the set priority level, it is possible to perform a process of preferentially transmitting the data with the high priority level in the on-vehicle network. Thus, the data from the external device located in the significant peripheral area can be more reliably transmitted to, for example, an on-vehicle device that performs autonomous driving control. Therefore, in the on-vehicle network, useful information can be satisfactorily transmitted.

(16) A communication control program according to the present disclosure is a communication control program used in an on-vehicle device installed on a vehicle, and the program causes a computer to function as: a processing unit configured to create correspondence information that indicates a correspondence relationship between peripheral position information indicating a position of a peripheral area around the vehicle, and a priority level; and a communication unit configured to transmit the correspondence information created by the processing unit to an extra-vehicular communication device that is installed on the vehicle and is communicable with an external device located outside the vehicle.

According to the above configuration, in the extra-vehicular communication device, a priority level according to the position of an external device can be set for data from the external device. Therefore, when, for example, autonomous driving control is performed, a high priority level can be set for data from an external device located in a significant peripheral area where presence/absence of an object should be confirmed. Further, in the extra-vehicular communication device, the data can be processed according to the set priority level. For example, it is possible to perform a process of preferentially transmitting the data with the high priority level in the on-vehicle network. Thus, the data from the external device located in the significant peripheral area can be more reliably transmitted to, for example, an on-vehicle device that performs autonomous driving control. Therefore, in the on-vehicle network, useful information can be satisfactorily transmitted.

Hereinafter, embodiments of the present disclosure will be described with reference to the drawings. In the drawings, the same or corresponding parts are denoted by the same reference signs, and description thereof is not repeated. At least some parts of the embodiments described below may be combined together as desired.

First Embodiment

[Configuration and Basic Operation]
FIG. 1 shows a configuration of a communication system according to a first embodiment of the present disclosure.

With reference to FIG. 1, the communication system 300 includes an extra-vehicular communication device 101 and external devices 181A, 181B, and 181C. Hereinafter, each of the external devices 181A, 181B, and 181C is also referred to as an external device 181.

In the communication system 300, two or four or more external devices 181 may be provided.

The extra-vehicular communication device 101 is installed in a target vehicle 1 and is communicable with the external devices 181 located outside the target vehicle 1.

The extra-vehicular communication device 101 is able to perform wireless communication with a wireless base station device (not shown) in accordance with a communication standard such as LTE (Long Term Evolution) or 3G, for example. Via the wireless base station device, the extra-vehicular communication device 101 communicates with, for example, a map server or the like that provides map information indicating a map based on absolute coordinates. The absolute coordinates are coordinates based on latitude and longitude, for example.

The external device 181A is a wireless terminal device such as a smart phone which is held by a pedestrian, and moves as the pedestrian moves. The external device 181A is able to perform pedestrian-to-vehicle communication with the extra-vehicular communication device 101.

The external device 181B is, for example, a wireless terminal device installed in another vehicle 2, and moves as the other vehicle 2 moves. The external device 181B is able to perform vehicle-to-vehicle communication with the extra-vehicular communication device 101.

The external device 181C is, for example, a roadside unit, such as an optical beacon, a radio beacon, or an ITS (Intelligent Transport System) spot, which is installed near a road. The external device 181C is able to perform roadside-to-vehicle communication with the extra-vehicular communication device 101.

Each external device 181 retains terminal position information indicating the position thereof. The terminal position information indicates, for example, absolute coordinates of the external device 181.

More specifically, each of the external devices 181A and 181B acquires the position thereof on the basis of, for example, radio waves from a GPS (Global Positioning System) satellite, and creates terminal position information indicating the acquired position. As for the external device 181C, terminal position information is registered by an installer when the external device 181C is installed.

[On-Vehicle Network 10]

Figure 2:
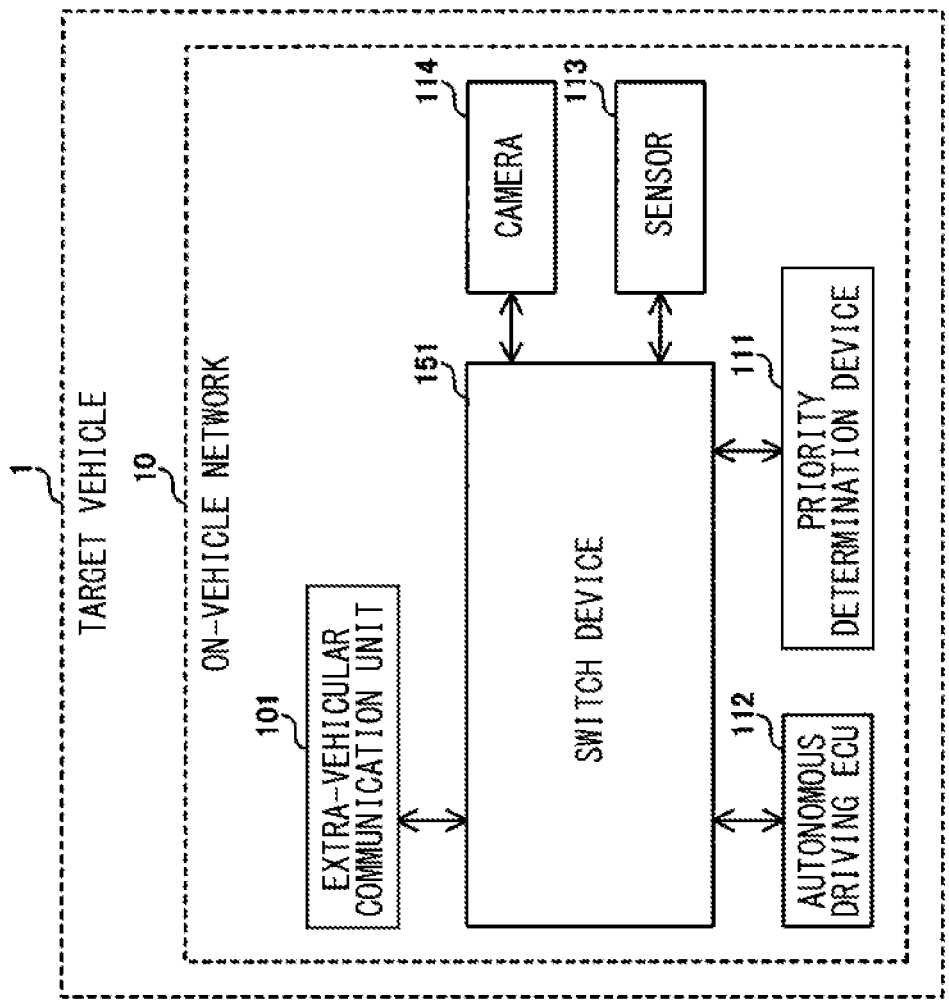
FIG. 2 shows a configuration of an on-vehicle communication system according to the first embodiment of the present disclosure.

FIG. 2 shows a configuration of an on-vehicle communication system according to the first embodiment of the present disclosure.

With reference to FIG. 2, the target vehicle 1 is equipped with an on-vehicle communication system 301. The on-vehicle communication system 301 includes the extra-vehicular communication device 101, a priority determination device (on-vehicle device) 111, an autonomous driving ECU (Electronic Control Unit) 112, a sensor 113, a camera 114, and a switch device 151.

An on-vehicle network 10 is established when the switch device 151 is connected to each of the extra-vehicular communication device 101, the priority determination device 111, the autonomous driving ECU 112, the sensor 113, and the camera 114.

In the on-vehicle network 10, for example, transmission/reception of Ethernet (registered trade mark) frames are performed in accordance with an Ethernet communication standard. In a part or the entirety of the on-vehicle network 10, transmission/reception of frames may be performed in accordance with a communication standard such as CAN (Controller Area Network) (registered trade mark), Flex Ray (registered trade mark), MOST (Media Oriented Systems Transport) (registered trade mark), or LIN (Local Interconnect Network).

The sensor 113 is, for example, a laser radar. The sensor 113 periodically detects an object around the target vehicle 1, and creates an Ethernet frame including sensor information indicating the detection result. The sensor 113 sets the autonomous driving ECU 112 as the destination of the created Ethernet frame, and transmits the Ethernet frame to the switch device 151.

The switch device 151 is, for example, a layer 2 (L2) switch, and relays the Ethernet frame.

Upon receiving, from the sensor 113, the Ethernet frame directed to the autonomous driving ECU 112, the switch device 151 transmits the received Ethernet frame to the autonomous driving ECU 112.

The camera 114, for example, periodically photographs surroundings of the target vehicle 1, and creates an Ethernet frame including camera information indicating the photographing result. The camera 114 sets the autonomous driving ECU 112 as the destination of the created Ethernet frame, and transmits the Ethernet frame to the autonomous driving ECU 112 via the switch device 151.

The autonomous driving ECU 112 controls driving of the target vehicle 1. The autonomous driving ECU 112, for example, may completely control driving of the target vehicle 1 or may perform drive assist, such as brake assist or lane keeping assist, for the target vehicle 1.

More specifically, the autonomous driving ECU 112, for example, acquires map information from the map server via the wireless base station device, the extra-vehicular communication device 101, and the switch device 151.

Further, the autonomous driving ECU 112, for example, acquires the position of the target vehicle 1 on the basis of radio waves from a GPS satellite at every predetermined period, and creates vehicle position information indicating the acquired position. This vehicle position information indicates, for example, absolute coordinates of the target vehicle 1.

Based on the sensor information and the camera information received from the sensor 113 and the camera 114, respectively, the autonomous driving ECU 112 detects an object around the target vehicle 1, such as another vehicle 2, a pedestrian, or a structure.

Based on the map information acquired from the map server, the created vehicle position information, and the object detection result, the autonomous driving ECU 112 controls driving of the target vehicle 1.

Further, the autonomous driving ECU 112, for example, creates state information indicating the autonomous driving state of the target vehicle 1, and transmits the created state information to a registration destination (in this example, the priority determination device 111).

The state information includes, for example, traveling information indicating the direction, speed, and the like of traveling of the target vehicle 1, detection information indicating the detection result, the vehicle position information, and the map information. The direction in which the target vehicle 1 travels is indicated based on a magnetic azimuth, for example.

The autonomous driving ECU 112, for example, creates state information at a predetermined frequency, and transmits the created state information to the registration destination (i.e., the priority determination device 111) via the switch device 151.

The autonomous driving ECU 112 may change the state information creation frequency in accordance with the traveling state of the target vehicle 1.

Further, the autonomous driving ECU 112, for example, transmits an Ethernet frame that includes a response request for confirming whether or not an external device 181 exists around the target vehicle 1, to the extra-vehicular communication device 101 via the switch device 151 at every predetermined time. A destination address of this response request is a broadcast address, for example.

The priority determination device 111, for example, acquires the state of autonomous driving of the target vehicle 1 on the basis of the state information received from the autonomous driving ECU 112, and creates, on the basis of the acquired state, correspondence information that indicates a correspondence relationship between peripheral position information indicating the position of a peripheral area around the target vehicle 1, and a priority level.

Specifically, the priority determination device 111, for example, creates new correspondence information in accordance with movement of the target vehicle 1.

Further, the priority determination device 111, for example, updates the correspondence information, and creates, as post-update correspondence information, correspondence information including a combination of peripheral position information and a priority level, which is different from the pre-update correspondence information.

In this example, there are 8 priority levels, for example. Specifically, the values of the priority levels are 0 to 7, for example. The greater the value of the priority level is, the higher the priority level is. The number of the priority levels is not limited to 8, and may be 2 to 7, or 9 or more.

The priority determination device 111, for example, updates a peripheral area table Tab1 each time the priority determination device 111 receives state information from the autonomous driving ECU 112.

Figure 4:
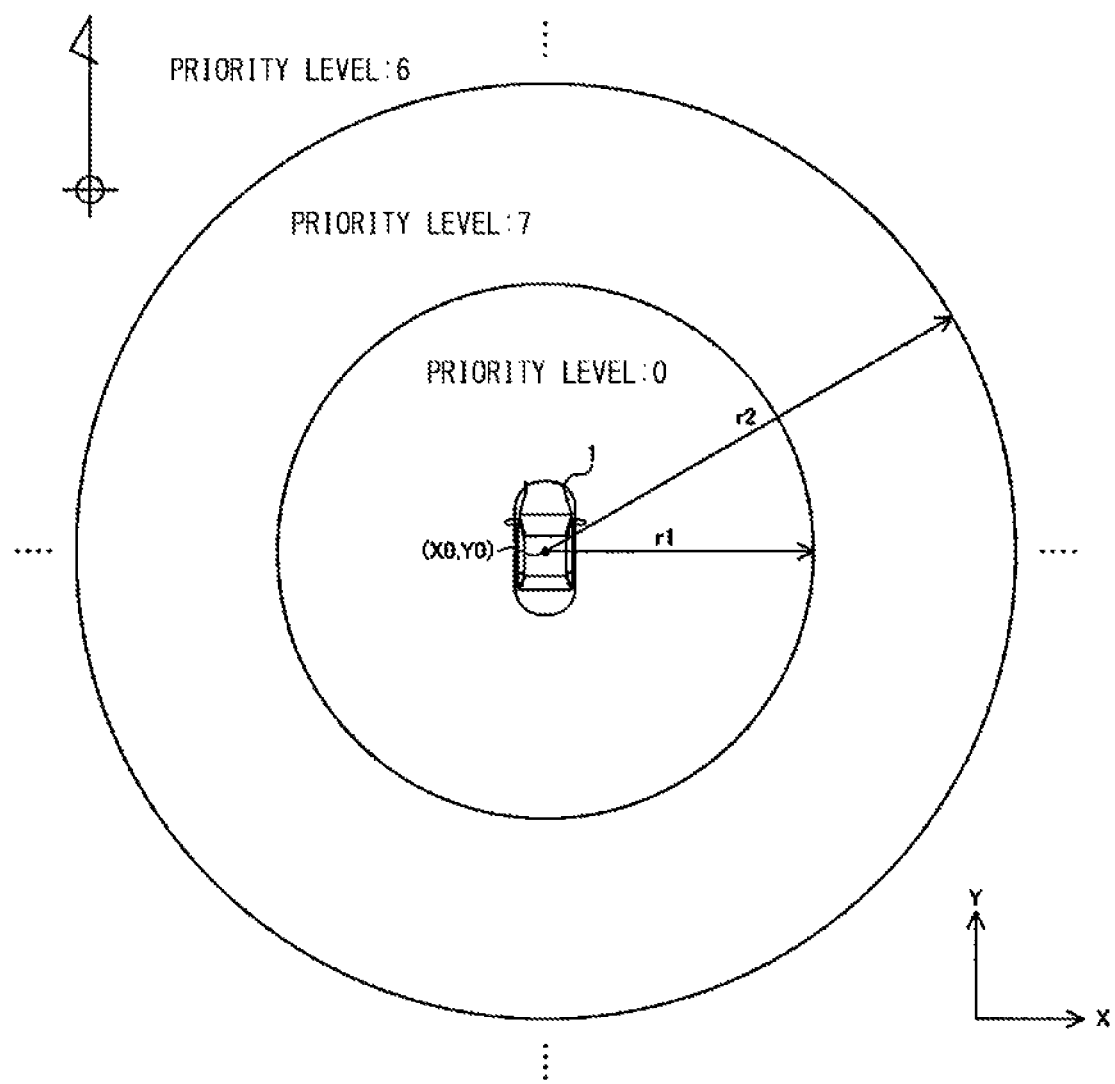
FIG. 4 shows an example of peripheral areas set by a priority determination device in the on-vehicle communication system according to the first embodiment of the present disclosure.

FIG. 3 shows an example of a peripheral area table created by the priority determination device in the on-vehicle communication system according to the first embodiment of the present disclosure. FIG. 4 shows an example of peripheral areas that are set by the priority determination device in the on-vehicle communication system according to the first embodiment of the present disclosure.

With reference to FIG. 3 and FIG. 4, the priority determination device 111, for example, creates a peripheral area table Tab1 representing a correspondence relationship between the positions of peripheral areas and priority levels. The peripheral area table Tab1 is an example of correspondence information.

More specifically, the priority determination device 111, for example, sets a plurality of peripheral areas on the basis of the state information. Each peripheral area is determined based on, for example, (X0, Y0) as absolute coordinates of the position of the target vehicle 1 and the range of a radius r, and has a doughnut shape. Each peripheral area abuts on an adjacent peripheral area, for example. Although the priority determination device 111 is configured to set a plurality of peripheral areas, the priority determination device 111 may be configured to set a single peripheral area.

The priority determination device 111 associates each of the set peripheral areas with the priority level, for transmission in the on-vehicle network 10, of data transmitted from an external device 181 located in the peripheral area.

More specifically, based on the state information, the priority determination device 111 determines, for example, whether the target vehicle 1 is traveling on a residential street or a road with high visibility.

For example, upon determining that the target vehicle 1 is traveling on a residential street, the priority determination device 111 sets the priority levels for the respective peripheral areas as follows.

That is, the priority determination device 111 sets the priority level for a peripheral area closer to the target vehicle 1 to a greater value, and sets the priority level for a peripheral area farther from the target vehicle 1 to a smaller value.

Further, the priority determination device 111, for example, sets the priority level for a peripheral area (hereinafter also referred to as "detection peripheral area"), which is included in a range (hereinafter also referred to as "detection range") in which presence/absence of an object is detectable based on an object detection result, to the smallest value.

Specifically, in this example, an area (hereinafter also referred to as "first peripheral area") within a circle that is centered around the target vehicle 1 and has a radius r1, is included in the detection range.

Meanwhile, areas as follows are not included in the detection range: an area (hereinafter also referred to as "second peripheral area") within a circle that is centered around the target vehicle 1, is outside the circle of the radius r1, and has a radius r2 greater than the radius r1; and an area (hereinafter also referred to as "third peripheral area") within a circle (not shown) that is centered around the target vehicle 1, is outside the circle of the radius r2, and has a radius r3 greater than the radius r2.

Since the first peripheral area is a detection peripheral area where an object is detectable by the sensor 113 and the camera 114, the priority determination device 111 sets the priority level for this area to zero.

Since the second peripheral area is a peripheral area that is closest to the target vehicle 1 among the peripheral areas that are not detection peripheral areas, the priority determination device 111 sets the priority level for this area to 7 which is the highest level.

Since the third peripheral area is a peripheral area that is second closest to the target vehicle 1 among the peripheral areas that are not detection peripheral areas, the priority determination device 111 sets the priority level for this area to 6 which is the second highest level.

In the on-vehicle network 10, for example, data with a priority level of a greater value is transmitted more preferentially. Therefore, in the aforementioned setting, data from an external device 181 located in a peripheral area (e.g., the second peripheral area) which is close to the target vehicle 1 and is not included in the detection range, is transmitted more preferentially than data from an external device 181 located in a peripheral area (e.g., the third peripheral area) which is distant from the target vehicle 1 or in the detection peripheral area, i.e., the first peripheral area.

Meanwhile, for example, upon determining that the target vehicle 1 is traveling on a road with high visibility, the priority determination device 111 sets the priority levels for the peripheral area close to the target vehicle 1 and the detection peripheral area to smaller values, and sets the priority level for the peripheral area distant from the target vehicle 1 to a greater value.

Specifically, for example, since the first peripheral area is a detection peripheral area where an object is detectable by the sensor 113 and the camera 114, the priority determination device 111 sets the priority level for this area to zero.

Since the second peripheral area is a peripheral area that is closest to the target vehicle 1 among the peripheral areas that are not detection peripheral areas, the priority determination device 111 sets the priority level for this area to 1 which is the second lowest level.

Since the third peripheral area is a peripheral area that is second closest to the target vehicle 1 among the peripheral areas that are not detection peripheral areas, the priority determination device 111 sets the priority level for this area to 2 which is the third lowest level.

According to the aforementioned setting, in the on-vehicle network 10, data from an external device 181 located in a peripheral area (e.g., the third peripheral area) distant from the target vehicle 1 is transmitted more preferentially than data from an external device 181 located in a peripheral area (e.g., the second peripheral area) close to the target vehicle 1 or in the detection peripheral area, i.e., the first peripheral area.

The priority determination device 111 creates table information T1 indicating the created peripheral area table Tab1, and transmits an Ethernet frame including the created table information T1 to the extra-vehicular communication device 101 via the switch device 151.

When receiving new state information from the autonomous driving ECU 112 after transmission of the table information T1, the priority determination device 111 updates the peripheral area table Tab1.

More specifically, the priority determination device 111 creates a new peripheral area table Tab1 (hereinafter also referred to as "post-update peripheral area table Tab1") on the basis of the new state information while maintaining the already-transmitted peripheral area table Tab1 (hereinafter also referred to as "pre-update peripheral area table Tab1").

The priority determination device 111 compares the pre-update peripheral area table Tab1 with the post-update peripheral area table Tab1, acquires combinations of "vehicle position" and "radius" with "priority level", which are different between the above tables, and creates difference table information DT1 indicating the acquired combinations.

The priority determination device 111 transmits an Ethernet frame including the created difference table information DT1 to the extra-vehicular communication device 101 via the switch device 151.

Figure 5:
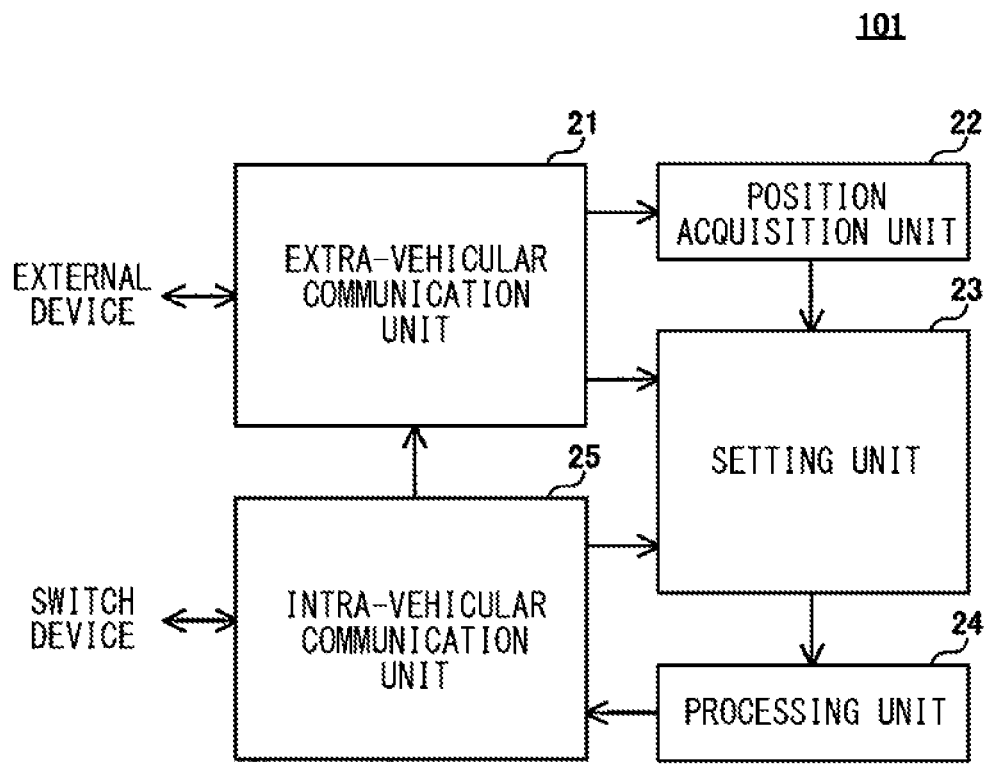
FIG. 5 shows a configuration of an extra-vehicular communication device in the on-vehicle communication system according to the first embodiment of the present disclosure.

FIG. 5 shows the configuration of the extra-vehicular communication device in the on-vehicle communication system according to the first embodiment of the present disclosure.

With reference to FIG. 5, the extra-vehicular communication device 101 includes an extra-vehicular communication unit (reception unit) 21, a position acquisition unit 22, a setting unit 23, a processing unit 24, and an intra-vehicular communication unit (correspondence information acquisition unit) 25.

The intra-vehicular communication unit 25 in the extra-vehicular communication device 101 is communicable with the switch device 151, for example.

The intra-vehicular communication unit 25 acquires correspondence information. Specifically, upon receiving an Ethernet frame including the table information T1 from the priority determination device 111, the intra-vehicular communication unit 25 acquires the table information T1 from the received Ethernet frame, and outputs the acquired table information T1 to the setting unit 23.

The intra-vehicular communication unit 25 acquires, as post-update correspondence information, for example, a combination of peripheral position information and a priority level, which is different from the acquired correspondence information. Specifically, the intra-vehicular communication unit 25 receives, as the post-update correspondence information, the difference table information DT1 from the switch device 151.

Further, the intra-vehicular communication unit 25, for example, acquires new correspondence information in accordance with movement of the target vehicle 1. Specifically, for example, since the correspondence information is updated at a predetermined frequency in the priority determination device 111 and the target vehicle 1 is moving, the intra-vehicular communication unit 25 acquires new correspondence information in accordance with the movement of the target vehicle 1.

More specifically, upon receiving an Ethernet frame including the difference table information DT1 from the priority determination device 111, the intra-vehicular communication unit 25 acquires the difference table information DT1 from the Ethernet frame, and outputs the acquired difference table information DT1 to the setting unit 23.

Further, upon receiving an Ethernet frame including a response request from the autonomous driving ECU 112, the intra-vehicular communication unit 25 acquires the response request from the received Ethernet frame, and outputs the acquired response request to the extra-vehicular communication unit 21.

The extra-vehicular communication unit 21 is communicable with an external device 181, for example. Upon receiving the response request from the intra-vehicular communication unit 25, the extra-vehicular communication unit 21 stores the received response request in a wireless frame. Then, the extra-vehicular communication unit 21 confirms that the destination address of the response request is a broadcast address, and broadcasts the wireless frame.

Referring back to FIG. 1, upon receiving the wireless frame including the response request from the extra-vehicular communication device 101, the external device 181 creates response information which indicates presence of the external device 181 and whose destination is the autonomous driving ECU 112, in accordance with the response request included in the received wireless frame, and then transmits the wireless frame including the created response information to the extra-vehicular communication device 101. This response information includes, for example, the aforementioned terminal position information.

Referring back to FIG. 5, the extra-vehicular communication unit 21 in the extra-vehicular communication device 101 receives data (hereinafter also referred to as "reception data") from the external device 181.

Specifically, upon receiving the wireless frame including the response information from the external device 181, the extra-vehicular communication unit 21 acquires the response information from the received wireless frame, and outputs the acquired response information to the position acquisition unit 22 and the setting unit 23.

Based on the reception data received by the extra-vehicular communication unit 21, the position acquisition unit 22 acquires transmission source position information indicating the position of the transmission source of the reception data.

More specifically, upon receiving the response information from the extra-vehicular communication unit 21, the position acquisition unit 22 extracts the terminal position information as the transmission source position information from the received response information, and outputs the extracted transmission source position information to the setting unit 23.

The setting unit 23 sets a priority level for the reception data on the basis of the transmission source position information acquired by the position acquisition unit 22 and the correspondence information acquired by the intra-vehicular communication unit 25.

More specifically, upon receiving the table information T1 from the intra-vehicular communication unit 25, the setting unit 23 retains the peripheral area table Tab1 (refer to FIG. 3) indicated by the received table information T1.

Further, upon receiving the difference table information DT1 from the intra-vehicular communication unit 25, the setting unit 23 updates the peripheral area table Tab1 on the basis of the received difference table information DT1.

Upon receiving the response information from the extra-vehicular communication unit 21 and the corresponding transmission source position information from the position acquisition unit 22, the setting unit 23 sets a priority level for the response information on the basis of the received transmission source position information and the peripheral area table Tab1.

More specifically, the setting unit 23 specifies a peripheral area that includes the absolute coordinates indicated by the transmission source position information, among the peripheral areas included in the peripheral area table Tab1. Then, the setting unit 23 sets the priority level corresponding to the specified peripheral area, as the priority level for the response information. The setting unit 23 outputs the set priority level and the response information to the processing unit 24.

The processing unit 24 processes the reception data in accordance with the priority level set by the setting unit 23.

More specifically, upon receiving the priority level and the response information from the setting unit 23, the processing unit 24 checks the received priority level.

For example, if the value of the checked priority level is not smaller than a predetermined threshold Th1, the processing unit 24 outputs the priority level and the response information to the intra-vehicular communication unit 25.

On the other hand, for example, if the value of the checked priority level is smaller than the threshold Th1, the processing unit 24 discards the response information.

Upon receiving the priority level and the response information from the processing unit 24, the intra-vehicular communication unit 25 creates an Ethernet frame including the received response information, and performs the following process.

That is, the intra-vehicular communication unit 25 sets a value of a priority control field in the Ethernet frame, specifically, a value of CoS (Class of Service) according to Tag VLAN (Virtual Local Area Network), to the value indicated by the priority level.

Then, the intra-vehicular communication unit 25 transmits the created Ethernet frame to the switch device 151.

Although the intra-vehicular communication unit 25 is configured to set a value of CoS, if the response information is transmitted according to IP protocol, the intra-vehicular communication unit 25 may be configured to set a value of ToS (Type of Service) in an IPv4 header or a value of TC (Traffic Class) in an IPv6 header.

Referring back to FIG. 2, upon receiving the Ethernet frame from the extra-vehicular communication device 101, the switch device 151 checks the value of CoS in the received Ethernet frame, and transmits the Ethernet frame at the priority level according to the checked value to the autonomous driving ECU 112.

More specifically, for example, when the traffic volume of the Ethernet frame to be relayed is not less than a predetermined value, the switch device 151 discards or transfers the Ethernet frame in accordance with the value of CoS.

Upon receiving the Ethernet frame from the switch device 151, the autonomous driving ECU 112, for example, retains the received Ethernet frame in a reception buffer (not shown), and checks the value of CoS in the received Ethernet frame.

When the amount of data in the reception buffer is not less than a predetermined value, the autonomous driving ECU 112 discards the Ethernet frame in the reception buffer in accordance with the value of CoS.

As for an Ethernet frame not to be discarded, the autonomous driving ECU 112 acquires response information from the Ethernet frame. Then, based on terminal position information included in the acquired response information, the autonomous driving ECU 112 recognizes the position of a pedestrian, another vehicle 2, a roadside unit, etc., around the target vehicle 1, and controls driving of the target vehicle 1, taking the recognition result into consideration.

In the extra-vehicular communication device 101, the response information received from the external device 181 is a target for which a priority level is set. However, the present disclosure is not limited thereto. Another type of information received from the external device 181 may be a target for which a priority level is set.

[Another Example 1 for Setting Peripheral Area]

Figure 7:
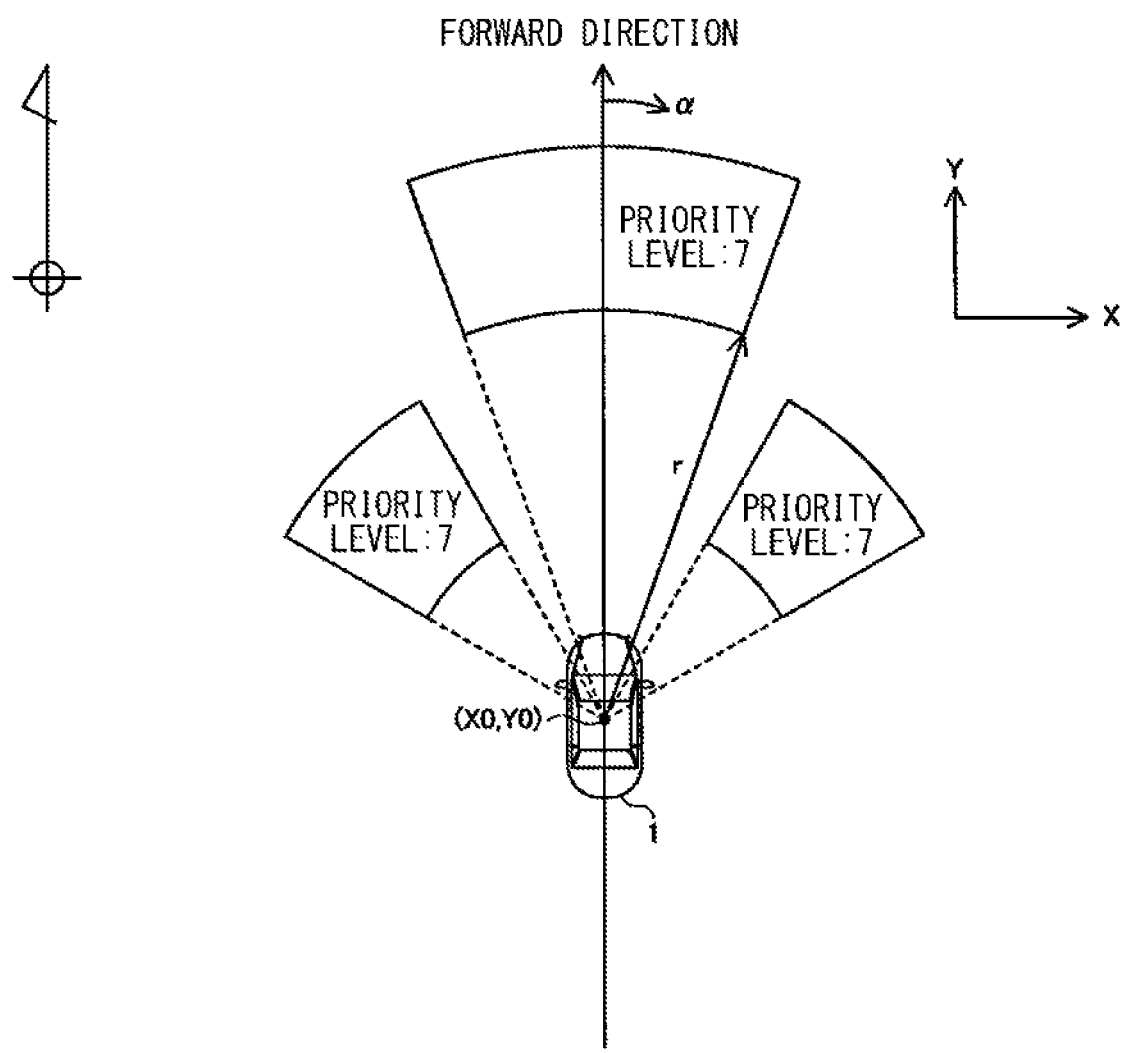
FIG. 7 shows an example of peripheral areas set by the priority determination device in the on-vehicle communication system according to the first embodiment of the present disclosure.

FIG. 6 shows an example of a peripheral area table created by the priority determination device in the on-vehicle communication system according to the first embodiment of the present disclosure. FIG. 7 shows an example of peripheral areas set by the priority determination device in the on-vehicle communication system according to the first embodiment of the present disclosure. FIG. 7 shows an example of peripheral areas with the values of priority levels being set to 7.

With reference to FIG. 6 and FIG. 7, the priority determination device 111 creates, for example, a peripheral area table Tab2 representing a correspondence relationship between the positions of peripheral areas and priority levels. The peripheral area table Tab2 is an example of correspondence information.

More specifically, the priority determination device 111 determines, for example, whether the corresponding target vehicle 1 is traveling on a residential street or a road with high visibility, on the basis of the state information received from the autonomous driving ECU 112.

For example, upon determining that the target vehicle 1 is traveling on a residential street, the priority determination device 111 sets, based on the state information, a peripheral area located 20 meters forward of the target vehicle 1, a peripheral area located 10 meters forward of the target vehicle 1 in an obliquely rightward direction, and a peripheral area located 10 meters forward of the target vehicle 1 in an obliquely leftward direction, as shown in FIG. 7.

More specifically, for example, the priority determination device 111 sets these peripheral areas by, based on the state information, specifying: absolute coordinates (X0, Y0) indicating the position of the target vehicle 1; a range of an azimuth a with respect to a forward direction along which the target vehicle 1 travels; and a range of a distance r from the target vehicle 1. Then, the priority determination device 111 sets the values of the priority levels for these peripheral areas to 7, for example.

The priority determination device 111 further sets one or a plurality of peripheral areas different from the aforementioned peripheral areas, and sets the values of the priority levels for the set peripheral areas to 6 or less, for example.

Meanwhile, for example, upon determining that the target vehicle 1 is traveling on a road with high visibility, the priority determination device 111 sets a peripheral area (not shown) located 100 meters forward of the target vehicle 1, and sets the value of the priority level for the set peripheral area to 7, for example.

The priority determination device 111 further sets one or a plurality of peripheral areas different from the aforementioned peripheral areas, and sets the values of the priority levels for the set peripheral areas to 6 or less, for example.

Based on the setting result, the priority determination device 111 creates table information T2 indicating the peripheral area table Tab2, and transmits an Ethernet frame including the created table information T2 to the extra-vehicular communication device 101 via the switch device 151.

[Another Example 2 for Setting Peripheral Area]

Figure 9:
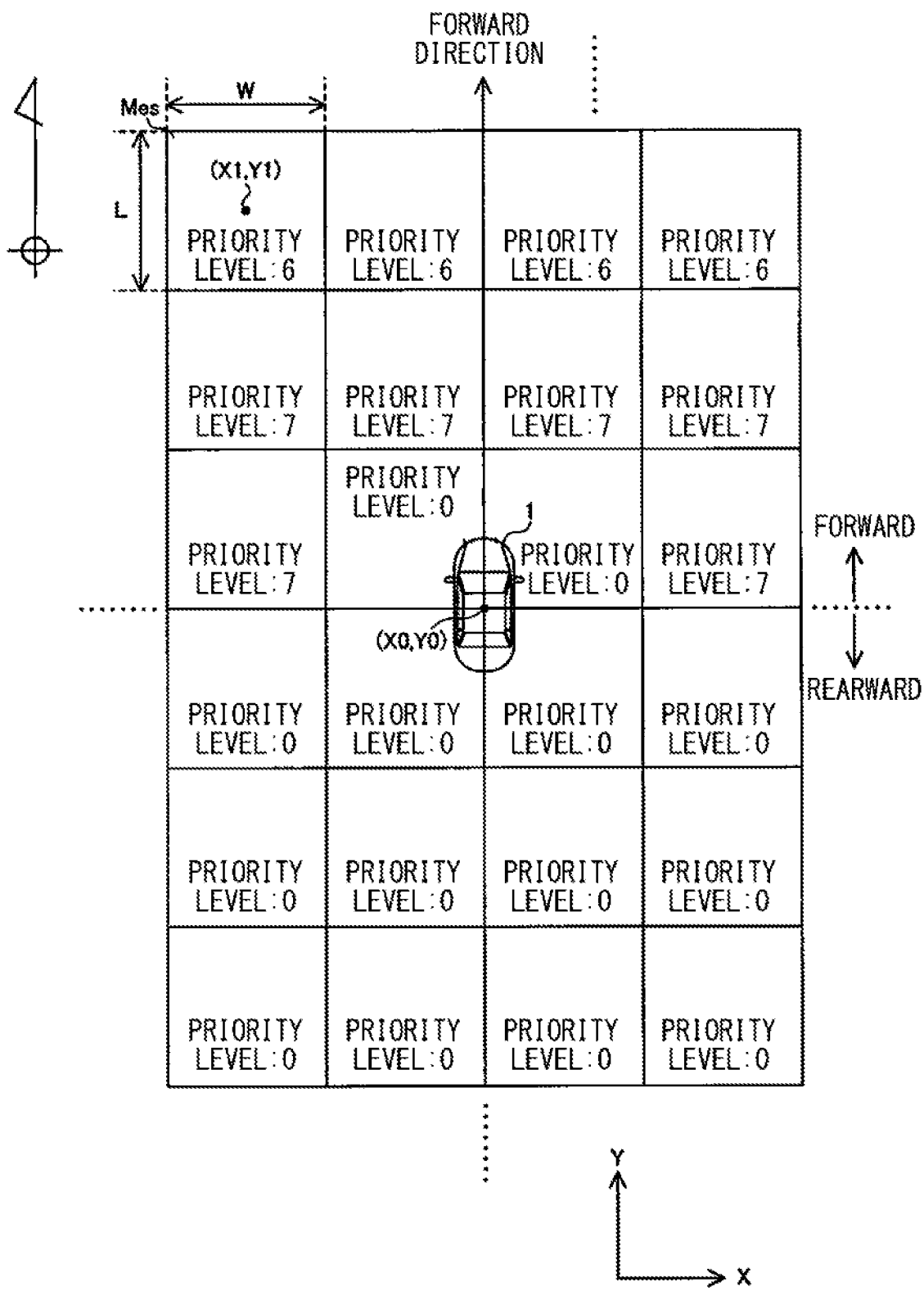
FIG. 9 shows an example of peripheral areas set by the priority determination device in the on-vehicle communication system according to the first embodiment of the present disclosure.

FIG. 8 shows an example of a peripheral area table created by the priority determination device in the on-vehicle communication system according to the first embodiment of the present disclosure. FIG. 9 shows an example of peripheral areas set by the priority determination device in the on-vehicle communication system according to the first embodiment of the present disclosure.

With reference to FIG. 8 and FIG. 9, the priority determination device 111 creates, for example, a peripheral area table Tab3 representing a correspondence relationship between the positions of peripheral areas and priority levels. The peripheral area table Tab3 is an example of correspondence information.

More specifically, the priority determination device 111 sets, for example, a plurality of peripheral areas on the basis of the state information received from the autonomous driving ECU 112. These peripheral areas are, for example, square meshes Mes each being determined based on: the forward direction along which the target vehicle 1 travels; the reference position based on the absolute coordinates; and specified length L and width W. The respective meshes Mes may have the same size or different sizes. Each mesh Mes abuts on adjacent meshes Mes. The reference position is located at the center of the array of the meshes Mes.

For example, upon determining, based on the state information, that the target vehicle 1 is traveling on a residential street, the priority determination device 111 sets the priority levels for the respective meshes Mes as follows.

That is, as shown in FIG. 9, the priority determination device 111, for example, sets the smaller values of priority levels for: the meshes Mes located rearward of the position (X0, Y0) of the target vehicle 1; and the meshes that are included in the detection range and the meshes that are distant from the target vehicle 1 among the meshes Mes located forward of the position (X0, Y0) of the target vehicle 1.

Meanwhile, the priority determination device 111 sets the greater values of priority levels for the meshes that are not included in the detection range and are close to the target vehicle 1 among the meshes Mes located forward of the position (X0, Y0) of the target vehicle 1.

On the other hand, for example, upon determining that the target vehicle 1 is traveling on a road with high visibility, the priority determination device 111 sets the priority levels for the respective meshes Mes as follows.

That is, the priority determination device 111, for example, sets the smaller values of priority levels for: the meshes Mes located rearward of the position (X0, Y0) of the target vehicle 1; and the meshes Mes that are included in the detection range and the meshes Mes that are close to the target vehicle 1 among the meshes Mes located forward of the position (X0, Y0) of the target vehicle 1.

Meanwhile, the priority determination device 111 sets the greater values of priority levels for the meshes Mes that are not included in the detection range and are distant from the target vehicle 1 among the meshes Mes located forward of the position (X0, Y0) of the target vehicle 1.

Based on the setting result, the priority determination device 111 creates table information T3 indicating the peripheral area table Tab3, and transmits an Ethernet frame including the created table information T3 to the extra-vehicular communication device 101 via the switch device 151.

[Operation Flow]

Each of the devices in the on-vehicle communication system 301 includes a computer, and an arithmetic processing unit such as a CPU in the computer reads out a program including a part or all of steps in the sequence diagram or flow chart described below from a memory (not shown), and executes the program. The programs for the plurality of devices can be externally installed. The programs for the plurality of devices are each distributed in a state of being stored in a storage medium.

Figure 10:
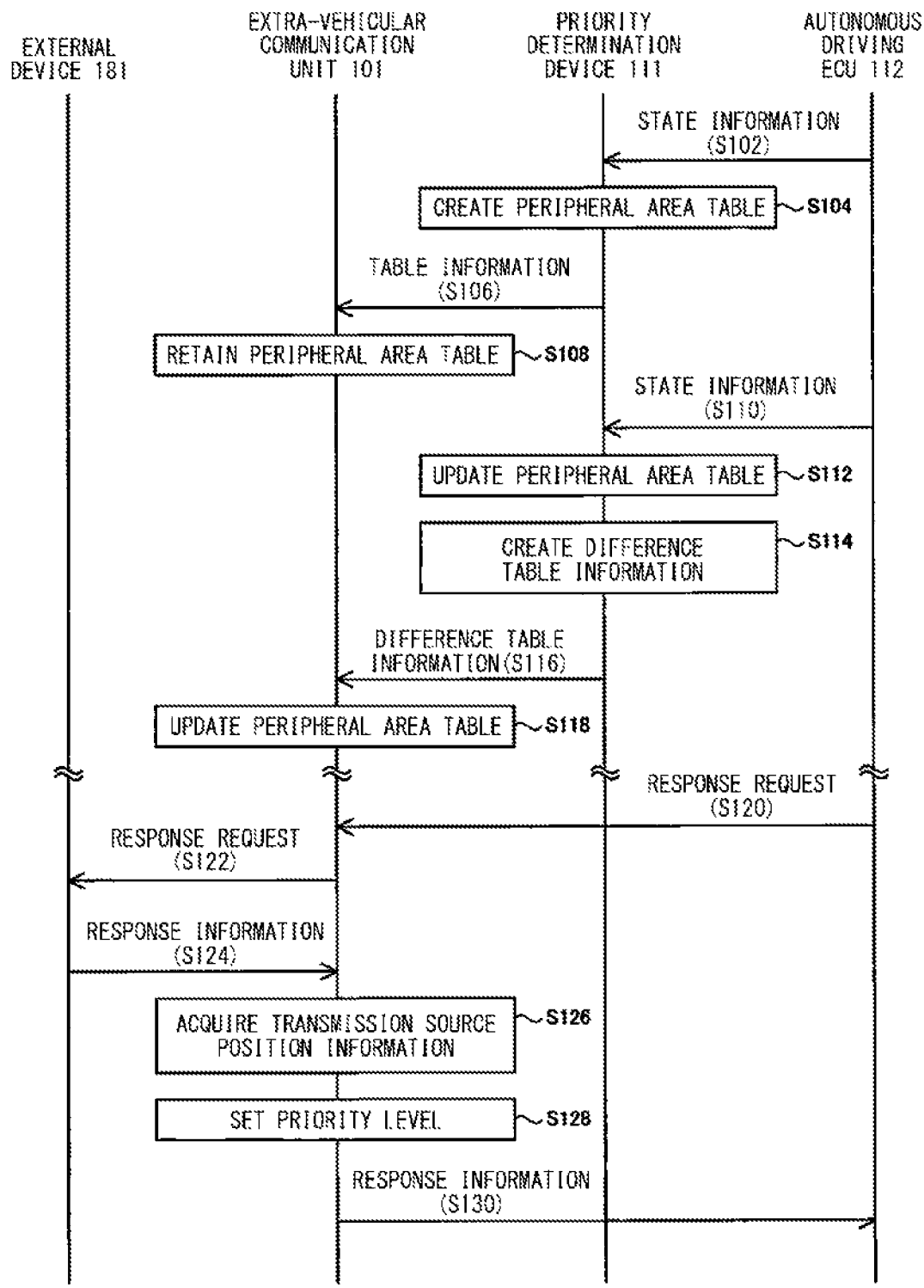
FIG. 10 shows an example of a sequence when the extra-vehicular communication device sets a priority level for reception data, in the on-vehicle communication system according to the first embodiment of the present disclosure.

FIG. 10 shows an example of a sequence when the extra-vehicular communication device sets a priority level for reception data in the on-vehicle communication system according to the first embodiment of the present disclosure.

With reference to FIG. 10, first, the autonomous driving ECU 112 creates state information, and transmits the created state information to the priority determination device 111 which is a registration destination (step S102).

Upon receiving the state information from the autonomous driving ECU 112, the priority determination device 111 creates a peripheral area table Tab1 on the basis of the received state information (step S104).

Next, the priority determination device 111 transmits table information T1 indicating the formed peripheral area table Tab1 to the extra-vehicular communication device 101 via the switch device 151 (step S106).

Upon receiving the table information T1 from the priority determination device 111, the extra-vehicular communication device 101 retains the peripheral area table Tab1 indicated by the received table information T1 (step S108).

Next, the autonomous driving ECU 112 creates new state information, and transmits the created new state information to the priority determination device 111 which is a registration destination (step S110).

Upon receiving the new state information from the autonomous driving ECU 112, the priority determination device 111 updates the peripheral area table Tab1 on the basis of the received new state information (step S112).

Next, the priority determination device 111 compares the pre-update peripheral area table Tab1 with the post-update peripheral area table Tab1, and acquires a combination of "vehicle position" and "radius" with "priority level", which is different between the above tables, and creates difference table information DT1 indicating the acquired combination (step S114).

Next, the priority determination device 111 transmits the created difference table information DT1 to the extra-vehicular communication device 101 via the switch device 151 (step S116).

Upon receiving the difference table information DT1 from the priority determination device 111, the extra-vehicular communication device 101 updates the peripheral area table Tab1 on the basis of the received difference table information DT1 (step S118).

Next, the autonomous driving ECU 112 transmits a response request whose destination address is a broadcast address, to the extra-vehicular communication device 101 via the switch device 151 (step S120).

Upon receiving the response request from the autonomous driving ECU 112, the extra-vehicular communication device 101 broadcasts the received response request (step S122).

Upon receiving the response request, the external device 181 transmits, in response to the received response request, response information whose destination is the autonomous driving ECU 112, to the extra-vehicular communication device 101 (step S124).

Upon receiving the response information from the external device 181, the extra-vehicular communication device 101 acquires the terminal position information, i.e., the transmission source position information, from the received response information (step S126).

Next, the extra-vehicular communication device 101 sets a priority level for the response information on the basis of the peripheral area table Tab1 and the transmission source position information (step S128).

For example, when the value of the set priority level is not smaller than the threshold Th1, the extra-vehicular communication device 101 transmits the response information with the set priority level to the autonomous driving ECU 112 via the switch device 151 (step S130).

If the value of the set priority level is smaller than the threshold Th1 in the above step S130, the extra-vehicular communication device 101 may discard the response information.

The extra-vehicular communication device according to the first embodiment of the present disclosure is configured to include the extra-vehicular communication unit 21 communicable with the external device 181. However, the present disclosure is not limited thereto. The extra-vehicular communication device 101 may be configured to include a reception unit that simply receives data from the external device 181, instead of the extra-vehicular communication unit 21.

In the extra-vehicular communication device according to the first embodiment of the present disclosure, the position acquisition unit 22 is configured to acquire the transmission source position information from the reception data. However, the present disclosure is not limited thereto. The position acquisition unit 22 may be configured to create the transmission source position information on the basis of the reception data. Specifically, for example, in a configuration where the extra-vehicular communication unit 21 measures a reception intensity of radio waves including a wireless frame transmitted from the external device 181, and an angle of arrival of the radio waves, the position acquisition unit 22 performs the following operation. That is, based on the reception intensity and the angle of arrival measured by the extra-vehicular communication unit 21, the position acquisition unit 22 calculates a distance between the extra-vehicular communication device 101 and the external device 181, and a direction of the external device 181 with respect to the position acquisition unit 22. Then, based on the calculated distance and direction, the position acquisition unit 22 creates the transmission source position information.

In the on-vehicle network according to the first embodiment of the present disclosure, the correspondence information is updated. However, the present disclosure is not limited thereto. In the on-vehicle network 10, the correspondence information may be fixedly operated. In this case, the correspondence information indicates, for example, a correspondence relationship between peripheral position information created based on relative coordinates with respect to the target vehicle 1, and a priority level. The extra-vehicular communication device 101, for example, retains the correspondence information, and registers itself, in the autonomous driving ECU 112, as a destination of the state information, thereby receiving the state information from the autonomous driving ECU 112 at a predetermined frequency. Based on the state information received from the autonomous driving ECU 112, the extra-vehicular communication device 101 converts the peripheral position information based on the relative coordinates into the peripheral position information based on the absolute coordinates, and sets the priority level for the reception data on the basis of the transmission source position information and the correspondence relationship between the peripheral position after conversion and the priority level.

In the on-vehicle network according to the first embodiment of the present disclosure, new correspondence information is transmitted in accordance with movement of the target vehicle 1. However, the present disclosure is not limited thereto. In the on-vehicle network 10, for example, new correspondence information may be transmitted when the target vehicle 1 is parked in a parking area, pulled over a road shoulder, or stopped at a signal light or the like. This correspondence information indicates, for example, a correspondence relationship, between the peripheral position information and the priority level, which allows the parked or stopped target vehicle 1 to start satisfactorily. This correspondence information is useful when the target vehicle 1 is started, for example.

When the on-vehicle network disclosed in Patent Literature 1 is connected to the external network outside the vehicle, an extra-vehicular communication device for communication with the external network may be provided in the vehicle. When the extra-vehicular communication device communicates with wireless terminal devices outside the vehicle, if the number of the wireless terminal devices increases or the amount of communication data between the extra-vehicular communication device and the wireless terminal devices increases, the amount of data transmitted in the on-vehicle network significantly increases. In this case, useful information may not be satisfactorily transmitted in the on-vehicle network.

Meanwhile, the extra-vehicular communication device according to the first embodiment of the present disclosure is installed on the target vehicle 1. The extra-vehicular communication unit 21 receives reception data that is data from an external device 181 outside the target vehicle 1. Based on the reception data received by the extra-vehicular communication unit 21, the position acquisition unit 22 creates transmission source position information indicating the position of the transmission source of the reception data. The intra-vehicular communication unit 25 acquires correspondence information indicating a correspondence relationship between peripheral position information indicating the position of a peripheral area around the target vehicle 1, and a priority level. The setting unit 23 sets the priority level for the reception data on the basis of the transmission source position information created by the position acquisition unit 22 and the correspondence information acquired by the intra-vehicular communication unit 25. Then, the processing unit 24 processes the reception data in accordance with the priority level set by the setting unit 23.

As described above, the priority level according to the position of an external device 181 is set for the data from the external device 181. Therefore, for example, when autonomous driving control is performed, it is possible to set a high priority level for data from an external device 181 located in a significant peripheral area where presence/absence of an object should be confirmed. In addition, since the data is processed according to the set priority level, it is possible to perform a process of preferentially transmitting the data with the high priority level in the on-vehicle network 10. Thus, the data from the external device 181 located in the significant peripheral area can be more reliably transmitted to, for example, an on-vehicle device that performs autonomous driving control. Therefore, in the on-vehicle network, useful information can be satisfactorily transmitted.

Further, in the extra-vehicular communication device according to the first embodiment of the present disclosure, the correspondence information is updated. Then, the intra-vehicular communication unit 25 acquires, as the post-update correspondence information, a combination of peripheral position information and a priority level, which is different from the correspondence information acquired previously.

Since a combination of peripheral position information and a priority level, which is different from that acquired previously, is acquired, a part, of the correspondence information, different from the last correspondence information can be rewritten, whereby the correspondence information updating process can be efficiently performed. In addition, since the amount of data of the post-update correspondence information can be reduced, it is possible to reduce, for example, communication load in the on-vehicle network 10.

Further, in the extra-vehicular communication device according to the first embodiment of the present disclosure, the intra-vehicular communication unit 25 acquires new correspondence information in accordance with movement of the target vehicle 1.

According to the above configuration, for example, even when the significant peripheral area is shifted because the traffic environment around the target vehicle 1 changes with movement of the target vehicle 1, it is possible to set an appropriate priority level according to the traffic environment for the reception data from the external device 181, on the basis of the correspondence information in which the current traffic environment is reflected.

Further, in the on-vehicle communication system according to the first embodiment of the present disclosure, the extra-vehicular communication device 101 is installed on the target vehicle 1. The priority determination device 111 creates correspondence information indicating a correspondence relationship between peripheral position information indicating the position of a peripheral area around the target vehicle 1, and a priority level, and transmits the created correspondence information to the extra-vehicular communication device 101. The extra-vehicular communication device 101 receives reception data that is data from the external device 181 outside the target vehicle 1, and creates transmission source position information indicating the position of the transmission source of the reception data, on the basis of the received reception data. Then, the extra-vehicular communication device 101 receives the correspondence information from the priority determination device 111, sets the priority level for the reception data on the basis of the received correspondence information and the created transmission source position information, and processes the reception data in accordance with the set priority level.

As described above, the priority level according to the position of the external device 181 is set for the data from the external device 181. Therefore, for example, when autonomous driving control is performed, it is possible to set a high priority level for data from an external device 181 located in a significant peripheral area where presence/absence of an object should be confirmed. In addition, since the data is processed according to the set priority level, it is possible to perform a process of preferentially transmitting the data with the high priority level in the on-vehicle network 10. Thus, the data from the external device 181 located in the significant peripheral area can be more reliably transmitted to, for example, an on-vehicle device that performs autonomous driving control. Therefore, in the on-vehicle network, useful information can be satisfactorily transmitted.

Next, another embodiment of the present disclosure will be described with reference to the drawings. In the drawings, the same or corresponding parts are denoted by the same reference numerals, and will not be repeatedly described. The contents other than those described below are the same as those of the on-vehicle communication system according to the first embodiment.

Second Embodiment

Figure 11:
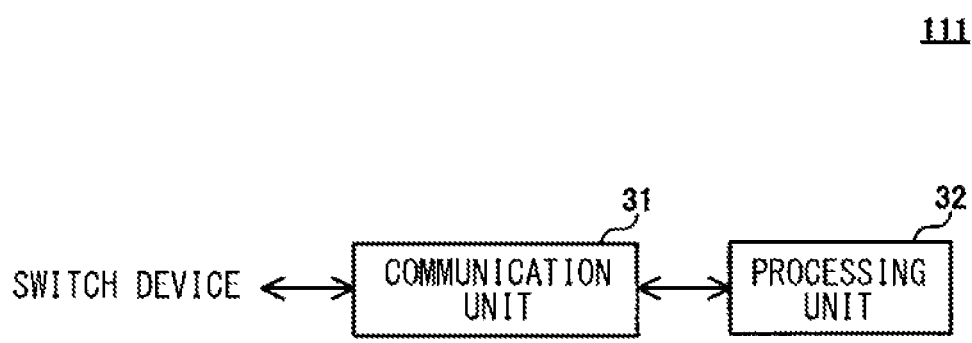
FIG. 11 shows a configuration of a priority determination device according to a second embodiment of the present disclosure.

FIG. 11 shows a configuration of a priority determination device according to a second embodiment of the present disclosure.

With reference to FIG. 11, the priority determination device 111 includes a communication unit 31 and a processing unit 32.

The communication unit 31 transmits/receives Ethernet frames to/from another device via the switch device 151.

Based on various types of information such as state information received via the switch device 151, the processing unit 32 creates correspondence information indicating a correspondence relationship between peripheral position information indicating the position of a peripheral area around a target vehicle 1, and a priority level, for transmission in the on-vehicle network 10, of data to be transmitted by a device located in the peripheral area. Then, the processing unit 32 outputs the correspondence information to the communication unit 31.

The communication unit 31 transmits the correspondence information received from the processing unit 32 to the extra-vehicular communication device 101 via the switch device 151.

As in the priority determination device according to the first embodiment of the present disclosure, the processing unit 32 creates, for example, new correspondence information according to movement of the target vehicle 1. In addition, for example, the processing unit 32 updates the correspondence information, and creates, as post-update correspondence information, correspondence information including a combination of peripheral position information and a priority level, which is different from the pre-update correspondence information.

[Example of Peripheral Area Table]

Figure 12:
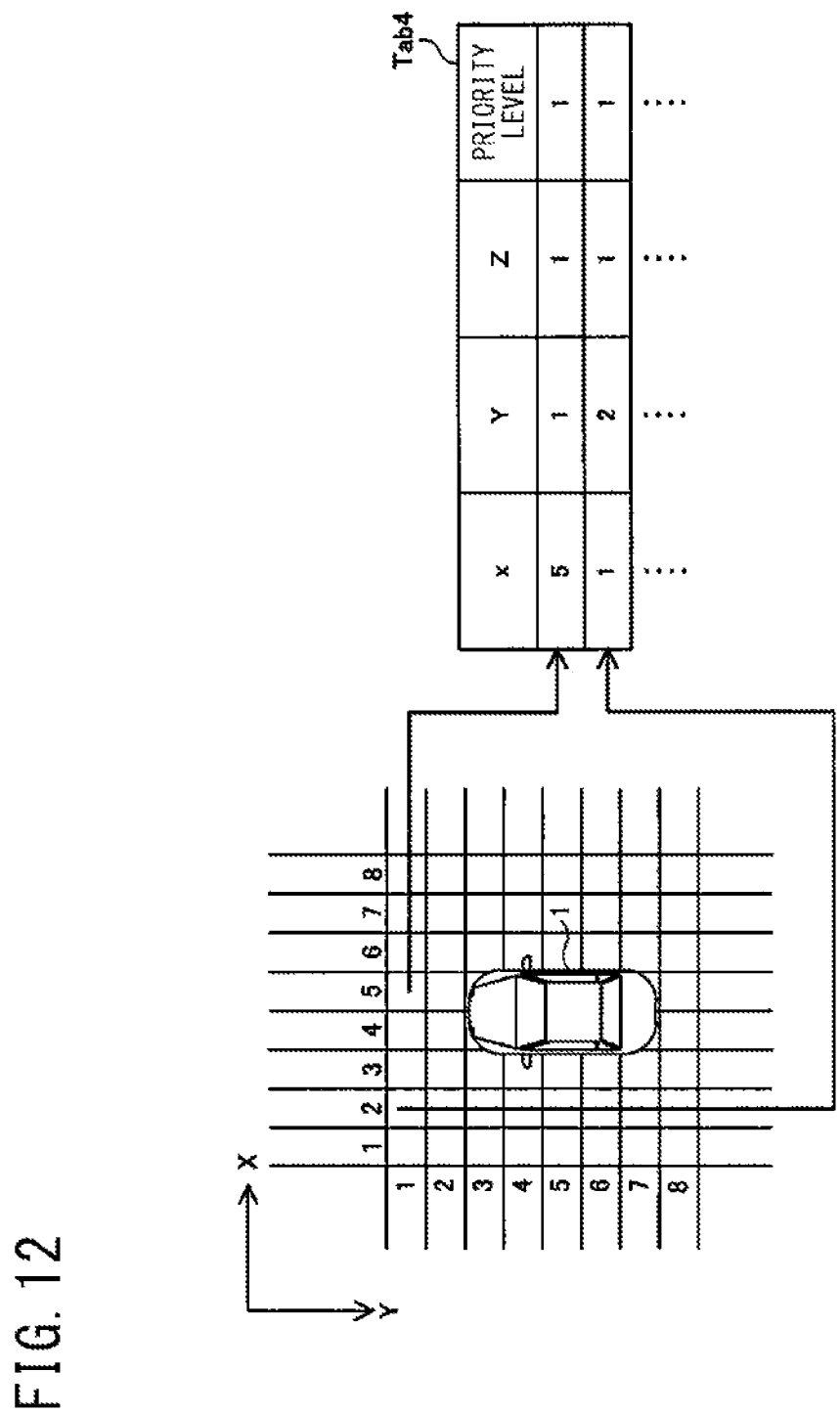
FIG. 12 shows an example of a peripheral area table created by a priority determination device in an on-vehicle communication system according to the second embodiment of the present disclosure.

FIG. 12 shows an example of a peripheral area table created by the priority determination device in the on-vehicle communication system according to the second embodiment of the present disclosure.

The processing unit 32 creates correspondence information indicating a correspondence relationship between peripheral position information indicating a relative position of a peripheral area with respect to the target vehicle 1, and a priority level.

Specifically, with reference to FIG. 12, the processing unit 32, for example, sets a coordinate system that is based on the position of the target vehicle 1 and is composed of: an x axis perpendicular to the advancing direction of the target vehicle 1; a y axis along the advancing direction of the target vehicle 1; and a z axis along the height direction of the target vehicle 1.

The processing unit 32 sets a priority level for each of square areas to which relative coordinates with respect to the position of the target vehicle 1 are assigned. The processing unit 32 creates a peripheral area table Tab4 representing a correspondence relationship between the relative coordinates indicating the position of each peripheral area, and a priority level.

Each of the peripheral area table Tab1 shown in FIG. 3, the peripheral area table Tab2 shown in FIG. 6, and the peripheral area table Tab3 shown in FIG. 8 also corresponds to correspondence information representing a correspondence relationship between peripheral position information indicating the relative position of each peripheral area with respect to the target vehicle 1, and a priority level.

Figure 13:
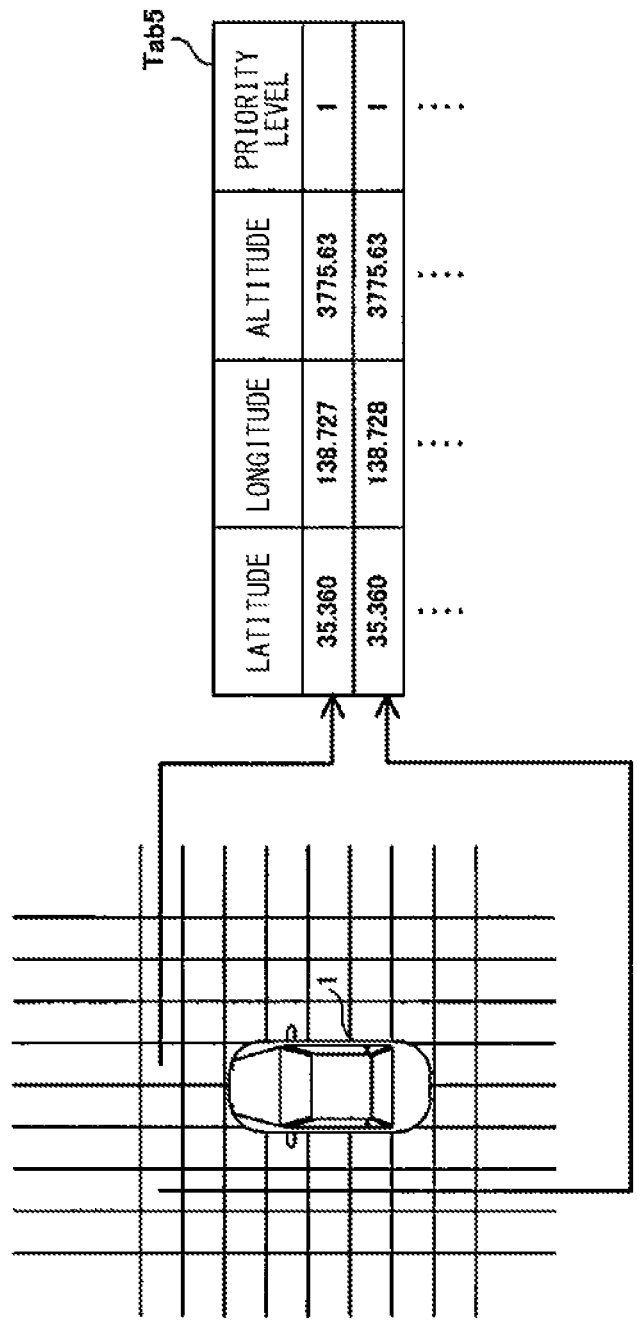
FIG. 13 shows an example of a peripheral area table created by the priority determination device in the on-vehicle communication system according to the second embodiment of the present disclosure.

FIG. 13 shows an example of a peripheral area table created by the priority determination device in the on-vehicle communication system according to the second embodiment of the present disclosure.

The processing unit 32 creates correspondence information indicating a correspondence relationship between peripheral position information indicating an absolute position of each peripheral area around the target vehicle 1, and a priority level.

Specifically, with reference to FIG. 13, the processing unit 32, for example, sets a coordinate system to which absolute coordinates obtained by a GPS or the like are assigned, for example. The absolute coordinates are (latitude, longitude, altitude).

The processing unit 32 sets a priority level for each of square areas to which absolute coordinates are assigned. The processing unit 32 creates a peripheral area table Tab5 representing a correspondence relationship between the absolute coordinates indicating the position of each peripheral area, and a priority level.

Figure 14:
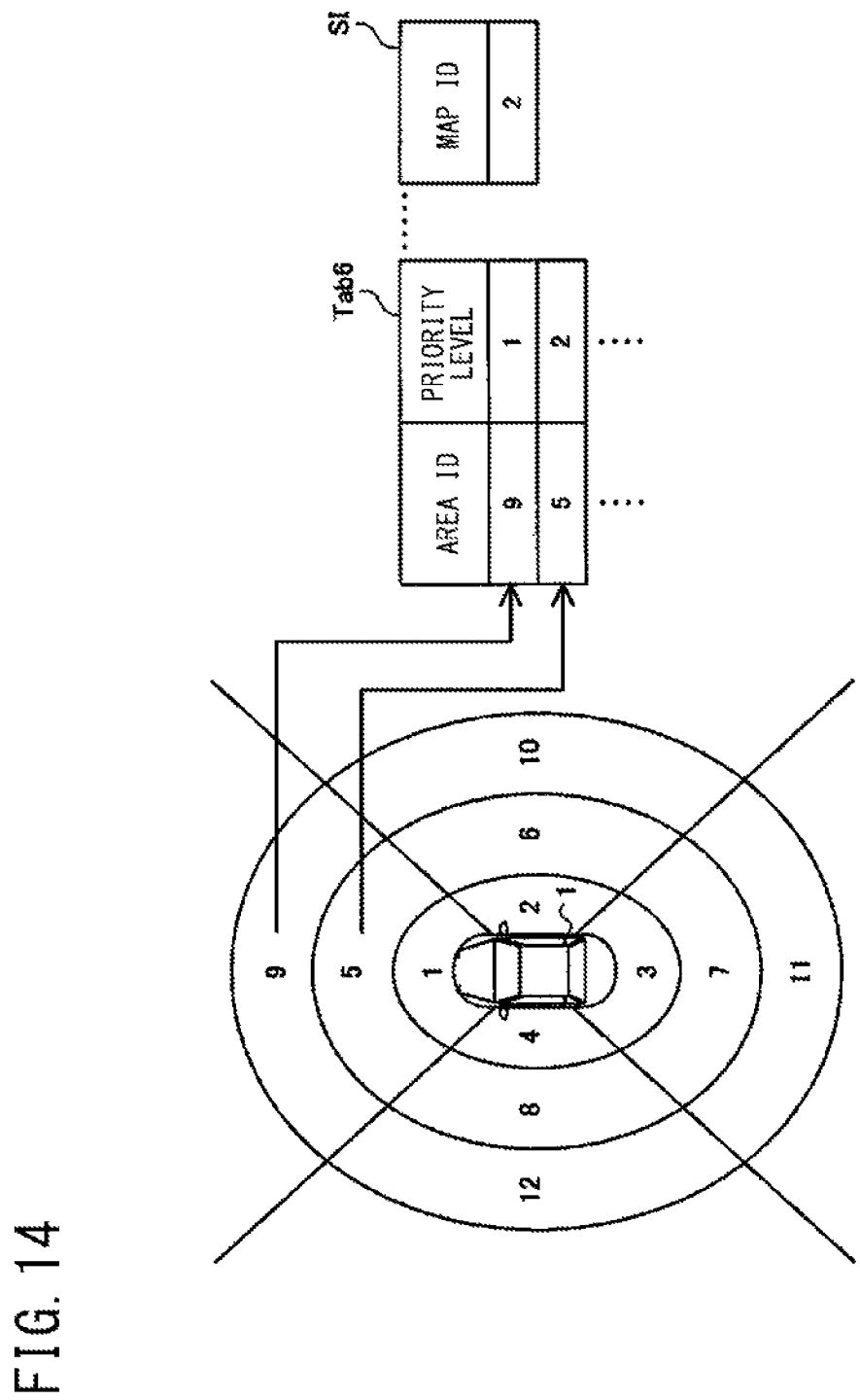
FIG. 14 shows an example of a peripheral area table created by the priority determination device in the on-vehicle communication system according to the second embodiment of the present disclosure.

FIG. 14 shows an example of a peripheral area table created by the priority determination device in the on-vehicle communication system according to the second embodiment of the present disclosure.

The processing unit 32 and the setting unit 23 in the extra-vehicular communication device 101 retain common area division information indicating the periphery of the target vehicle 1 being divided into a plurality of peripheral areas. For example, the area division information can be registered in the target vehicle 1 in advance in accordance with necessity in autonomous driving.

The processing unit 32 creates correspondence information indicating a correspondence relationship between identification information for each of the peripheral areas, i.e., the divided areas, in the area division information, and a priority level.

Specifically, with reference to FIG. 14, each of the processing unit 32 and the setting unit 23 retains, for example, area division information indicating the periphery of the target vehicle 1 being divided concentrically and in front, rear, left, and right directions. An area ID is assigned to each peripheral area in the area division information. The area division information may include a peripheral area in the height direction of the target vehicle 1.

The processing unit 32 sets a priority level for each area ID. Specifically, for example, the processing unit 32 sets a priority level for each peripheral area in accordance with difficulty in detecting an object.

The processing unit 32 creates a peripheral area table Tab6 representing a correspondence relationship between area IDs indicating peripheral positions and priority levels. The peripheral area table Tab6 corresponds to correspondence information indicating a correspondence relationship between peripheral position information indicating the relative position of each peripheral area with respect to the target vehicle 1, and a priority level.

Further, for example, each of the processing unit 32 and the extra-vehicular communication device 101 retains a plurality of types of area division information.

The processing unit 32 transmits the identification information of the area division information to the extra-vehicular communication device 101 via the communication unit 31, thereby changing the area division information.

More specifically, a map ID is assigned to the area division information. The processing unit 32 transmits, for example, a map change instruction SI indicating a map ID=2 to the extra-vehicular communication device 101 via the communication unit 31, thereby changing the area division information to that of the map ID=2.

The setting unit 23 in the extra-vehicular communication device 101 receives the map change instruction via the intra-vehicular communication unit 25, and changes the area division information to that of the map ID=2.

The processing unit 32 changes the area division information in accordance with the surrounding environment or the like of the target vehicle 1. Specifically, for example, the processing unit 32 changes the area division information depending on whether the target vehicle 1 is traveling in a normal mode or a low-speed mode, which is selected by the autonomous driving ECU 112 according to the number of pedestrians around the target vehicle 1.

The processing unit 32 does not necessarily have a function of creating all the three pieces of correspondence information as shown in FIG. 12 to FIG. 14. The processing unit 32 may have a function of creating any one or two of the three pieces of correspondence information.

[Example of Setting of Priority Level]

For example, based on the various types of information such as the state information received via the switch device 151, the processing unit 32 sets the priority levels in the correspondence information.

More specifically, the processing unit 32 sets the priority levels in accordance with, for example, at least one of a traveling direction, a traveling speed, a traveling road, a traveling position, a traveling mode, and a scheduled traveling route of the target vehicle 1, and the result of detection of an object around the target vehicle 1.

Specifically, for example, the processing unit 32 sets a high priority level for an area forward of the target vehicle 1.

For example, the processing unit 32 changes the setting content of the priority level in accordance with the rise and fall of the traveling speed of the target vehicle 1.

For example, the processing unit 32 changes the setting content of the priority level in accordance with whether the target vehicle 1 is traveling on an expressway or an ordinary road.

For example, the processing unit 32 sets a high priority level for an area such as an intersection, a merging point, or a point into which entry of another vehicle is predicted.

For example, the processing unit 32 changes the setting content of the priority level in accordance with whether the target vehicle 1 is traveling in an urban area or a suburb.

For example, the processing unit 32 changes the setting content of the priority level in accordance with whether the target vehicle 1 is traveling in the normal mode or a low-speed mode.

For example, the processing unit 32 changes the setting content of the priority level in accordance with whether or not the target vehicle 1 will soon pass through a busy intersection.

For example, the processing unit 32 changes the setting content of the priority level in accordance with whether or not the corresponding peripheral area is an area where the target vehicle 1 can detect an object. Thus, for example, data from a peripheral area where coverage by the sensor 113 or the like of the target vehicle 1 is insufficient, can be preferentially transmitted.

Alternatively, for example, the processing unit 32 creates correspondence information on the basis of event information, relating to a traffic event around the target vehicle 1, which is acquired from outside the target vehicle 1, e.g., which is received from the external device 181 via the extra-vehicular communication device 101 and the switch device 151.

Specifically, the event information is, for example, information about a point where traffic accidents often occur due to jumping-out onto the road, or information about a roadwork to be held. In this case, the processing unit 32 sets a high priority level for the peripheral area corresponding to the event information.

The processing unit 32 creates correspondence information on the basis of event information retained therein. This event information may be, for example, event information received by the processing unit 32 from outside the target vehicle 1 while the target vehicle 1 is traveling, or may be event information registered in the target vehicle 1 in advance.

The processing unit 32 may create correspondence information on the basis of event information that is not retained therein but is received at any time from outside the target vehicle 1. Alternatively, the processing unit 32 may create correspondence information on the basis of event information that is not received from outside the target vehicle 1 but is retained therein in advance.

As described above, in the on-vehicle device according to the second embodiment of the present disclosure, the processing unit 32 creates correspondence information indicating a correspondence relationship between peripheral position information indicating the position of a peripheral area around the target vehicle 1, and a priority level, for transmission in the on-vehicle network 10, of data transmitted by a device located in the peripheral area. Then, the communication unit 31 transmits the correspondence information created by the processing unit 32 to the extra-vehicular communication device 101 which is installed on the target vehicle 1 and is communicable with an external device 181 outside the target vehicle 1.

According to the above configuration, in the extra-vehicular communication device 101, a priority level according to the position of an external device 181 can be set for data from the external device 181. For example, when autonomous driving control is performed, a high priority level can be set for data from an external device 181 located in a significant peripheral area where presence/absence of an object should be confirmed. In addition, in the extra-vehicular communication device 101, the data can be processed according to the set priority level. For example, it is possible to perform a process of preferentially transmitting the data with the high priority level in the on-vehicle network 10. Thus, the data from the external device 181 located in the significant peripheral area can be more reliably transmitted to, for example, an on-vehicle device that performs autonomous driving control.

Thus, in the on-vehicle device according to the second embodiment of the present disclosure, useful information can be satisfactorily transmitted in the on-vehicle network.

Further, in the on-vehicle device according to the second embodiment of the present disclosure, the processing unit 32 creates correspondence information indicating a correspondence relationship between peripheral position information indicating the relative position of a peripheral area with respect to the target vehicle 1, and a priority level.

According to this configuration, when autonomous driving control or the like is performed, for example, a high priority level can be set for data from an external device 181 that is located in a peripheral area where it is difficult for the sensor or the like installed on the target vehicle 1 to detect an object.

Further, in the on-vehicle device according to the second embodiment of the present disclosure, the processing unit 32 creates correspondence information indicating a correspondence relationship between peripheral position information indicating the absolute position of a peripheral area around the target vehicle 1, and a priority level.

According to the above configuration, when autonomous driving control or the like is performed, for example, the target vehicle 1 on the map can be grasped, whereby it is possible to set a high priority level for data from an external device 181 located in a peripheral area, such as an intersection a few hundred meters ahead, which is difficult to be detected by the sensor or the like installed on the target vehicle 1. Further, for example, an appropriate priority level can be set by using information relating to a traffic event, such as information about a point where traffic accidents often occur due to jumping-out onto the road, or information about a roadwork to be held.

In the on-vehicle device according to the second embodiment of the present disclosure, the processing unit 32 and the extra-vehicular communication device 101 retain common area division information indicating the periphery of the target vehicle 1 being divided into a plurality of peripheral areas. Then, the processing unit 32 creates correspondence information indicating a correspondence relationship between identification information of each peripheral area in the area division information, and a priority level.

According to the above configuration, the amount of data transmitted from the priority determination device 111 can be reduced, whereby, for example, communication load in the on-vehicle network 10 can be reduced.

In the on-vehicle device according to the second embodiment of the present disclosure, the processing unit 32 and the extra-vehicular communication device 101 retain a plurality of types of area division information. Then, the processing unit 32 transmits identification information of area division information to the extra-vehicular communication device 101 via the communication unit 31, thereby changing the area division information.

According to the above configuration, it is possible to adopt appropriate division of peripheral areas and appropriate setting of priority levels according to the surrounding environment or the like of the target vehicle 1.

In the on-vehicle device according to the second embodiment of the present disclosure, the processing unit 32 sets a priority level according to at least one of a traveling direction, a traveling speed, a traveling road, a traveling position, a traveling mode, and a scheduled traveling route of the target vehicle 1.

According to the above configuration, it is possible to set an appropriate priority level according to the traveling state or the like of the target vehicle 1.

In the on-vehicle device according to the second embodiment of the present disclosure, the processing unit 32 sets a priority level according to at least one of: a result of detection of an object around the target vehicle 1; event information, relating to a traffic event around the target vehicle 1, acquired from outside the target vehicle 1; and event information retained in the processing unit 32.

According to the above configuration, an appropriate priority level according to the surrounding environment or the like of the target vehicle 1 can be set.

Further, in a communication control method according to the second embodiment of the present disclosure, first, correspondence information is created which indicates a correspondence relationship between peripheral position information indicating the position of a peripheral area around the target vehicle 1, and a priority level, for transmission in the on-vehicle network 10, of data transmitted by a device located in the peripheral area. Next, the created correspondence information is transmitted to the extra-vehicular communication device 101 which is installed on the target vehicle 1 and is communicable with an external device 181 located outside the target vehicle 1.

According to the above method, in the extra-vehicular communication device 101, a priority level according to the position of the external device 181 can be set for data from the external device 181. For example, when autonomous driving control is performed, a high priority level can be set for data from an external device 181 located in a significant peripheral area where presence/absence of an object should be confirmed. Further, in the extra-vehicular communication device 101, data can be processed according to the set priority level. For example, it is possible to perform a process of preferentially transmitting the data with the high priority level in the on-vehicle network 10. Thus, the data from the external device 181 located in the significant peripheral area can be transmitted with more reliability to an on-vehicle device that performs autonomous driving control, for example.

Therefore, in the communication control method according to the second embodiment of the present disclosure, useful information can be satisfactorily transmitted in the on-vehicle network.

The other configuration and operation are the same as those in the on-vehicle communication system according to the first embodiment, and therefore detailed description thereof is not repeated here.

The embodiments disclosed herein are illustrative in all aspects and should be considered not restrictive. The scope of the present invention is not limited by the configuration of the above-described embodiment but is defined by the claims, and is intended to include meaning equivalent to the scope of the claims and all modifications within the scope.

The above description includes the features in the additional notes below.

[Additional Note 1]

An extra-vehicular communication device installed on a vehicle, comprising:

a reception unit configured to receive data from an external device located outside the vehicle;

a position acquisition unit configured to create, based on the data received by the reception unit, transmission source position information indicating a position of a transmission source of the data;

a correspondence information acquisition unit configured to acquire correspondence information that indicates a correspondence relationship between peripheral position information indicating a position of a peripheral area around the vehicle, and a priority level;

a setting unit configured to set a priority level for the data, on the basis of the transmission source position information created by the position acquisition unit and the correspondence information acquired by the correspondence information acquisition unit; and a processing unit configured to process the data in accordance with the priority level set by the setting unit, wherein the external device is a wireless terminal device held by a pedestrian who is moving, a wireless terminal device installed in another vehicle that is moving, or a roadside unit provided near a road, the external device acquires a position thereof on the basis of radio waves from a GPS (Global Positioning System) satellite, and transmits data including terminal position information indicating the acquired position, the position acquisition unit acquires, from the data, the terminal position information as the transmission source position information, and the processing unit compares the priority level set by the setting unit with a predetermined threshold, and transmits or discards the data on the basis of a result of the comparison.

[Additional Note 2]

An on-vehicle communication system comprising:

an extra-vehicular communication device installed on a vehicle; and an on-vehicle device configured to create correspondence information that indicates a correspondence relationship between peripheral position information indicating a position of a peripheral area around the vehicle, and a priority level, and transmit the created correspondence information to the extra-vehicular communication device, wherein the extra-vehicular communication device receives data from an external device located outside the vehicle, and creates, based on the received data, transmission source position information indicating a position of a transmission source of the data, the extra-vehicular communication device receives the correspondence information from the on-vehicle device, sets a priority level for the data, on the basis of the received correspondence information and the created transmission source position information, and processes the data in accordance with the set priority level, the external device is a wireless terminal device held by a pedestrian who is moving, a wireless terminal device installed in another vehicle that is moving, or a roadside unit provided near a road, the external device acquires a position thereof on the basis of radio waves from a GPS satellite, and transmits data including terminal position information indicating the acquired position, the extra-vehicular communication device acquires, from the data, the terminal position information as the transmission source position information, and the extra-vehicular communication device compares the set priority level with a predetermined threshold, and transmits or discards the data on the basis of a result of the comparison.

[Additional Note 3]

An on-vehicle device installed on a vehicle, comprising:

a processing unit configured to create correspondence information that indicates a correspondence relationship between peripheral position information indicating a position of a peripheral area around the vehicle, and a priority level, for transmission in an on-vehicle network, of the data transmitted by a device located in the peripheral area; and a communication unit configured to transmit the correspondence information created by the processing unit to an extra-vehicular communication device that is installed on the vehicle and is communicable with an external device located outside the vehicle, wherein the extra-vehicular communication device receives data from the external device, creates transmission source position information indicating a position of a transmission source of the data on the basis of the received data, sets a priority level for the data on the basis of the created transmission source position information and the created correspondence information, and processes the data in accordance with the set priority level, the external device is a wireless terminal device held by a pedestrian who is moving, a wireless terminal device installed in another vehicle that is moving, or a roadside unit provided near a road, and the external device acquires a position thereof on the basis of radio waves from a GPS satellite, and transmits data including terminal position information indicating the acquired position.

REFERENCE SIGNS LIST 1 target vehicle
2 another vehicle
10 on-vehicle network
21 extra-vehicular communication unit (reception unit)
22 position acquisition unit
23 setting unit
24 processing unit
25 intra-vehicular communication unit (correspondence information acquisition unit)
31 communication unit
32 processing unit
101 extra-vehicular communication device
111 priority determination device (on-vehicle device)
112 autonomous driving ECU
113 sensor
114 camera
151 switch device
181 external device
300 communication system
301 on-vehicle communication system

The invention claimed is:

1. An extra-vehicular communication device installed on a vehicle, comprising:
a reception unit configured to receive data from an external device located outside the vehicle, the external device being a wireless terminal device held by a pedestrian, a wireless terminal device installed in another vehicle, or a roadside unit;
a position acquisition unit configured to create, based on the data received by the reception unit, transmission source position information indicating a position of a transmission source of the data;
a correspondence information acquisition unit configured to acquire correspondence information from a priority determination device that creates the correspondence information and is an on-vehicle device different from the extra-vehicular communication device, the correspondence information indicating a correspondence relationship between peripheral position information indicating an absolute position of a peripheral area around the vehicle, and a priority level related to autonomous driving control;
a setting unit configured to set a priority level for the data, on the basis of the transmission source position information created by the position acquisition unit and the correspondence information acquired by the correspondence information acquisition unit; and
a processing unit configured to process the data in accordance with the priority level set by the setting unit, wherein
the priority level is a priority level for transmission in an on-vehicle network installed on the vehicle and set based on difficulty of detecting an object in the peripheral area by a sensor installed on the vehicle,
the correspondence information acquisition unit acquires new correspondence information reflecting traffic environment around the vehicle that changes according to movement of the vehicle,
the processing unit determines preferentially transmitted data in the on-vehicle network, based on the priority level set by the setting unit,
wherein the correspondence information is updated, and
the correspondence information acquisition unit acquires, as post-update correspondence information, a combination of peripheral position information and a priority level, the combination being different from the correspondence information acquired previously.

2. A priority determination device installed on a vehicle, comprising:
a processing unit configured to create correspondence information that indicates a correspondence relationship between peripheral position information indicating an absolute position of a peripheral area around the vehicle, and a priority level of data transmitted by a device located in the peripheral area, the priority level related to autonomous driving control; and
a communication unit configured to transmit the correspondence information created by the processing unit to an extra-vehicular communication device that is installed on the vehicle and is communicable with an external device located outside the vehicle, the external device being a wireless terminal device held by a pedestrian, a wireless terminal device installed in another vehicle, or a roadside unit, wherein
the priority level is a priority level for transmission in an on-vehicle network installed on the vehicle and set based on difficulty of detecting an object in the peripheral area by a sensor installed on the vehicle,
the priority level is used to determine preferentially transmitted data in an on-vehicle network installed on the vehicle, wherein the data transmitted by the external device located in the peripheral area is also used to determine the preferentially transmitted data in the on-vehicle network,
the processing unit creates new correspondence information reflecting traffic environment around the vehicle that changes according to movement of the vehicle,
wherein the correspondence information is updated, and
the processing unit creates, as post-update correspondence information, a combination of peripheral position information and a priority level, the combination being different from the correspondence information created previously.

3. The priority determination device according to claim 2, wherein the processing unit creates the correspondence information that indicates the correspondence relationship between the peripheral position information indicating a relative position of the peripheral area with respect to the vehicle, and the priority level, and the priority level is set based on the correspondence information.

4. The priority determination device according to claim 2, wherein the processing unit and the extra-vehicular communication device retain common area division information indicating a periphery of the vehicle being divided into a plurality of peripheral areas, and the processing unit creates the correspondence information that indicates the correspondence relationship between identification information of each peripheral area in the area division information, and the priority level.

5. The priority determination device according to claim 4, wherein the processing unit and the extra-vehicular communication device retain a plurality of types of the area division information, and the processing unit transmits the identification information in the area division information to the extra-vehicular communication device via the communication unit, thereby changing the area division information.

6. An on-vehicle communication system comprising:

an extra-vehicular communication device installed on a vehicle; and a priority determination device configured to create correspondence information that indicates a correspondence relationship between peripheral position information indicating an absolute position of a peripheral area around the vehicle, and a priority level related to autonomous driving control, and transmits the created correspondence information to the extra-vehicular communication device, wherein the priority level is a priority level for transmission in an on-vehicle network installed on the vehicle and set based on difficulty of detecting an object in the peripheral area by a sensor installed on the vehicle, the extra-vehicular communication device receives data from an external device located outside the vehicle, and creates, based on the received data, transmission source position information indicating a position of a transmission source of the data, the external device being a wireless terminal device held by a pedestrian, a wireless terminal device installed in another vehicle, or a roadside unit, the extra-vehicular communication device receives the correspondence information from the priority determination device, sets a priority level for the data, on the basis of the received correspondence information and the created transmission source position information, and determines preferentially transmitted data in the on-vehicle network, based on the set priority level, the priority determination device creates new correspondence information reflecting traffic environment around the vehicle that changes according to movement of the vehicle, wherein the correspondence information is updated, and the priority determination device creates, as post-update correspondence information, a combination of peripheral position information and a priority level, the combination being different from the correspondence information created previously.

7. The priority determination device according to claim 2, wherein the processing unit sets the priority level in accordance with at least one of a traveling direction, a traveling speed, a traveling road, a traveling position, a traveling mode, and a scheduled traveling route of the vehicle.

8. The priority determination device according to claim 2, wherein the processing unit sets the priority level in accordance with at least one of: a result of detection of an object around the vehicle; event information, acquired from outside the vehicle, which relates to a traffic event around the vehicle; and the event information retained in the processing unit.

* * * * *